United States Patent
Sugimoto

(10) Patent No.: US 8,421,905 B2
(45) Date of Patent: Apr. 16, 2013

(54) IMAGE PICKUP APPARATUS AND IMAGE PICKUP METHOD USED FOR THE SAME

(75) Inventor: Masahiko Sugimoto, Kurokawa-gun (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 13/465,590

(22) Filed: May 7, 2012

(65) Prior Publication Data

US 2012/0218461 A1    Aug. 30, 2012

Related U.S. Application Data

(63) Continuation of application No. 12/323,076, filed on Nov. 25, 2008.

(30) Foreign Application Priority Data

Nov. 28, 2007 (JP) .................. 2007-307728

(51) Int. Cl.
*H04N 5/232* (2006.01)

(52) U.S. Cl.
USPC ........ 348/349; 348/347; 348/352; 348/353; 382/103

(58) Field of Classification Search .......... 348/347, 348/349, 352
See application file for complete search history.

(56) References Cited

U.S. PATENT DOCUMENTS

| | | | | |
|---|---|---|---|---|
| 5,689,741 A | * | 11/1997 | Hozumi et al. | 396/130 |
| 5,767,989 A | * | 6/1998 | Sakaguchi | 358/474 |
| 6,972,797 B2 | * | 12/2005 | Izumi | 348/348 |
| 7,113,616 B2 | * | 9/2006 | Ito et al. | 382/103 |
| 7,324,150 B2 | | 1/2008 | Shiraishi | |
| 2002/0149689 A1 | * | 10/2002 | Sannoh et al. | 348/333.02 |
| 2003/0146988 A1 | | 8/2003 | Shiraishi | |
| 2005/0254141 A1 | * | 11/2005 | Suzuki et al. | 359/696 |
| 2006/0289618 A1 | * | 12/2006 | Sugimoto | 235/120 |
| 2007/0064145 A1 | | 3/2007 | Sugimoto | |
| 2007/0222877 A1 | * | 9/2007 | Kurane | 348/294 |
| 2008/0122940 A1 | * | 5/2008 | Mori | 348/222.1 |
| 2008/0246852 A1 | * | 10/2008 | Mori | 348/222.1 |
| 2008/0284900 A1 | * | 11/2008 | Abe | 348/349 |

FOREIGN PATENT DOCUMENTS

| | | |
|---|---|---|
| EP | 1 335 589 A1 | 8/2003 |
| JP | 08-248510 A | 9/1996 |
| JP | 2003-207712 A | 7/2003 |
| JP | 2007-034261 A | 2/2007 |
| JP | 3934954 B2 | 3/2007 |

\* cited by examiner

*Primary Examiner* — Clayton E LaBalle
*Assistant Examiner* — Warren K Fenwick
(74) *Attorney, Agent, or Firm* — Sughrue Mion, PLLC

(57) ABSTRACT

An aspect of the present invention provides an image pickup apparatus, comprising: an image pickup optical system which forms an image of a subject; an imaging device which obtains an image by picking up the image of the subject via the image pickup optical system; a target detection device which detects a size of a target in the image; a first control device which controls a focus position of the image pickup optical system according to the size of the target detected by the target detection device; and a second control device which performs continuous AF that detects a focusing position where a contrast in the image reaches a local maximum by moving the focus position of the image pickup optical system, moves the focus position of the image pickup optical system to the focusing position and keeps an in-focus state.

20 Claims, 19 Drawing Sheets

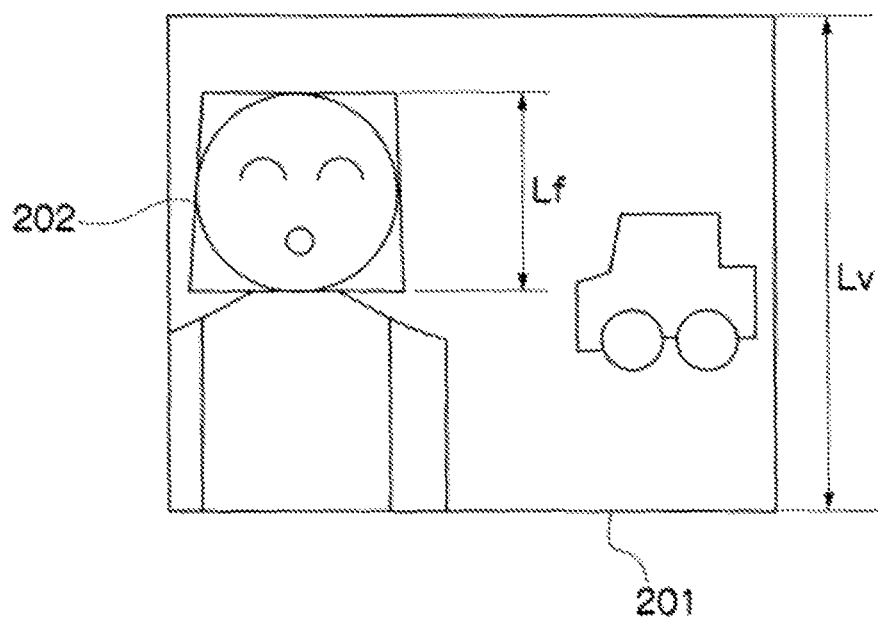

FACE LOOKING LEFT

FACE LOOKING FRONT

FACE LOOKING RIGHT

FACE WITHOUT TILT

FACE TILTED BY 30 DEGREES

FACE TILTED BY 60 DEGREES

FACE TILTED BY 90 DEGREES

PRESENT POSITION p1 = INF + na

↓

IN PROPORTION TO RECIPROCAL OF SUBJECT DISTANCE

↓

IN PROPORTION TO SUBJECT RATIO

PREDICTED FOCUSING POSITION p2 = INF + nb
$= $ INF + na * Pa/Pa_old

IMAGE PICKUP APPARATUS AND IMAGE PICKUP METHOD USED FOR THE SAME

The present invention is a Continuation of U.S. application Ser. No. 12/323,076, which was filed on Nov. 25, 2008, which claims priority to Japanese Application No. 2007-307728, filed on Nov. 28, 2007, the entire disclosures of which are incorporated herein by reference.

BACKGROUND OF THE INVENTION

1. Field of the Invention

The present invention relates to an image pickup apparatus that has a continuous focusing function for performing continuous focusing actions, and an image pickup method used for the same.

2. Description of the Related Art

Various types of cameras having an auto-focus function have been known.

Japanese Patent Application Laid-Open No. 08-248510 discloses a hybrid camera having a still camera part, a video camera part, and a taking lens shared by the parts, wherein, in a still image taking mode, the camera performs servo control based on repetitive detection by a focus detection device when a motion detection device detects that a subject is moving and performs one-shot control that stops a lens drive to make focus lock in response to attainment of an in-focus state when the motion detection device detects that a subject is not moving.

Japanese Patent Application Laid-Open No. 2003-207712 discloses an imaging device that adjusts the focus of optical equipment, including: an optical part that generates a subject image by receiving a light beam from a subject; a contrast detection part that detects the contrast value of the subject image; a range finding part that computes distance information on the distance from a focusing unit to the subject; an adjustment indication reception part that receives indication information showing the adjustment of the focus of the optical part; a focus control part that adjusts the focus of the optical part when the adjustment indication reception part receives the indication information; and a distance information storage part that stores the contrast value that the contrast detection part detects and the distance information that the range finding part computes, when the adjustment indication reception part receives the indication information.

Japanese Patent No. 3934954 (Japanese Patent Application Laid-Open No. 2003-232984) discloses a CPU that, before performing a focusing action in response to focusing instruction operation, compares present image data obtained immediately after the focusing instruction operation and obtained when a focus lens is at a previous focusing position detected by a previous focusing action with a previous image data obtained in the midst of the previous focusing action or immediately after finishing the previous focusing action and obtained when the focus lens is at the previous focusing position, and judges whether or not the in-focus state from the previous focusing action is maintained. In the case of detecting the focusing position when the in-focus state is not maintained, the focus lens is not driven or the driving area of the focus lens is narrowed.

SUMMARY OF THE INVENTION

A general auto-focus (AF) function makes focus lock in response to attainment of an in-focus state. That is highly possible to cause an out-of-focus state (so called "pinbokeh (blurry photo)") when a subject is moving. A continuous AF function serially performs a focusing action to achieve highly accurate focusing. Unfortunately, the continuous AF function has to find a peak position (the focus lens position where the image shows the peak contrast) while performing step driving of the focus lens, which takes much time in focusing.

The present invention intends to ensure both a focus tracking ability and focusing accuracy for a moving subject.

A first aspect of the present invention provides an image pickup apparatus comprising: an image pickup optical system which forms an image of a subject; an imaging device which obtains an image by picking up the image of the subject via the image pickup optical system; a target detection device which detects a size of a target in the image; a first control device which controls a focus position of the image pickup optical system according to the size of the target detected by the target detection device; and a second control device which performs continuous AF that detects a focusing position where a contrast in the image reaches the local maximum by moving the focus position of the image pickup optical system, moves the focus position of the image pickup optical system to the focusing position and keeps an in-focus state.

According to the first aspect, the image pickup apparatus can control the focus position of the image pickup optical system according to the size of the target in the image and also can detect a focusing position where a contrast in the image reaches the local maximum by moving the focus position of the image pickup optical system and control the focus position of the image pickup optical system. That enables less number of steps in driving the focus lens, ensuring both a focus tracking ability and focusing accuracy for a moving subject.

A second aspect of the present invention provides the image pickup apparatus according to the first aspect, further comprising: a predicted focusing position calculation device which calculates a predicted focusing position onto which light is predicted to be focused based on the size of the target.

According to the second aspect, the image pickup apparatus can limit a range of step driving the focus lens based on the predicted focusing position by calculating the predicted focusing position based on the size of the target. That enables much less number of steps in driving the focus lens, enhancing the focus tracking ability.

A third aspect of the present invention provides the image pickup apparatus according to the second aspect, wherein the first control device moves the focus position of the image pickup optical system to the predicted focusing position; and the second control device determines the focusing position based on the contrast in the image by moving the focus position of the image pickup optical system away from the predicted focusing position.

According to the third aspect, the image pickup apparatus detects the focusing position starting from the predicted focusing position as the origin. That can ensure both a focus speed and focusing accuracy.

A fourth aspect of the present invention provides the image pickup apparatus according to the second aspect, wherein the first control device moves the focus position of the image pickup optical system to an initial target position near the predicted focusing position; and the second control device determines the focusing position based on the contrast in the image by moving the focus position of the image pickup optical system from the initial target position toward the predicted focusing position.

According to the fourth aspect, the image pickup apparatus detects the focusing position starting around the predicted focusing position as the origin toward the predicted focusing position. That enables less number of times to reverse the direction to drive the focus lens for detecting the focusing position as a whole, enhancing the focus tracking ability.

A fifth aspect of the present invention provides the image pickup apparatus according to any one of the first to the fourth aspects, further comprising: an evaluation value calculating device which calculates an evaluation value indicative of the contrast in the image; wherein the first control device does not perform control on the focus position according to the size of the target if the evaluation value keeps less than a referential value.

According to the fifth aspect, the image pickup apparatus prevents wrong focusing even when a low contrast is kept.

A sixth aspect of the present invention provides the image pickup apparatus according to any one of the first to the fifth aspects, further comprising: a motion detection device which detects a motion of a subject; wherein the second control device does not perform detection of the focusing position based on the contrast in the image if the subject moves faster than a referential speed.

According to the sixth aspect, the image pickup apparatus can balance the focusing accuracy with the focusing speed (focus tracking ability).

A seventh aspect of the present invention provides the image pickup apparatus according to any one of the first to the sixth aspects, further comprising: a selection device which accepts a selection input as to which of focusing accuracy and focusing speed is prioritized, wherein the second control device performs the detection of the focusing position based on the contrast in the image when the focusing accuracy is prioritized, and does not perform the detection of the focusing position based on the contrast in the image when the focusing speed is prioritized.

According to the seventh aspect, the image pickup apparatus can perform focusing control according to the user's intention.

An eighth aspect of the present invention provides the image pickup apparatus according to any one of the second to the fourth aspects, wherein the first control device and the second control device do not move the focus position of the image pickup optical system when an absolute value of a difference between the focus position of the image pickup optical system and the predicted focusing position is equal to or less than a threshold.

According to the eighth aspect, the image pickup apparatus prevents the focus lens from being unstably driven (shaken or the like).

A ninth aspect of the present invention provides the image pickup apparatus according to the eighth aspect, wherein the first control device moves the focus position of the image pickup optical system to or near to the predicted focusing position when the absolute value of the difference between the focus position of the image pickup optical system and the predicted focusing position is larger than the threshold.

According to the ninth aspect, the image pickup apparatus enhances the focus tracking ability.

A tenth aspect of the present invention provides the image pickup apparatus according to the eighth or the ninth aspect, further comprising: an iris which adjusts the amount of light input into the imaging device via the image pickup optical system, wherein the threshold is changed according to an iris value of the iris.

According to the tenth aspect, the image pickup apparatus ensures the focusing accuracy.

An eleventh aspect of the present invention provides the image pickup apparatus according to the eighth or the ninth aspect, wherein the image pickup optical system has a zoom function, and the threshold is changed according to a zoom position or a focal length of the image pickup optical system.

According to the eleventh aspect, the image pickup apparatus ensures the focusing accuracy.

A twelfth aspect of the present invention provides the image pickup apparatus according to the eighth or the ninth aspect, wherein the threshold is changed according to the detected focusing position of the image pickup optical system or a subject distance corresponding to the focusing position.

According to the twelfth aspect, the image pickup apparatus ensures the focusing accuracy.

A thirteenth aspect of the present invention provides the image pickup apparatus according to the second aspect, wherein the predicted focusing position calculation device calculates the predicted focusing position based on a relationship between the size of the target detected by the target detection device and the subject distance corresponding to the focusing position or the focusing position.

According to the thirteenth aspect, the image pickup apparatus can calculate the predicted focusing position with accuracy, enhancing the focus tracking ability.

A fourteenth aspect of the present invention provides the image pickup apparatus according to the second aspect, wherein the predicted focusing position calculation device calculates the predicted focusing position based on a ratio of a past size of the target to a present size of the target detected by the target detection device.

According to the fourteenth aspect, the image pickup apparatus can calculate the predicted focusing position with accuracy, enhancing the focus tracking ability.

A fifteenth aspect of the present invention provides an image pickup method used in an image pickup apparatus including: an image pickup optical system which forms an image of a subject; an imaging device which obtains an image by picking up the image of the subject via the image pickup optical system; and a target detection device which detects a size of a target in the image, the image pickup method for performing: a first control of controlling a focus position of the image pickup optical system according to the size of the target detected by the target detection device; and a second control of performing continuous AF that detects a focusing position where a contrast in the image reaches the local maximum by moving the focus position of the image pickup optical system, moves the focus position of the image pickup optical system to the focusing position and keeps an in-focus state.

According to the present invention, the image pickup apparatus can ensure both the focus tracking ability and focusing accuracy for a moving subject.

BRIEF DESCRIPTION OF THE DRAWINGS

FIG. 2 is an illustration showing an exemplary image;

DETAILED DESCRIPTION OF THE PREFERRED EMBODIMENTS

Figure 1:
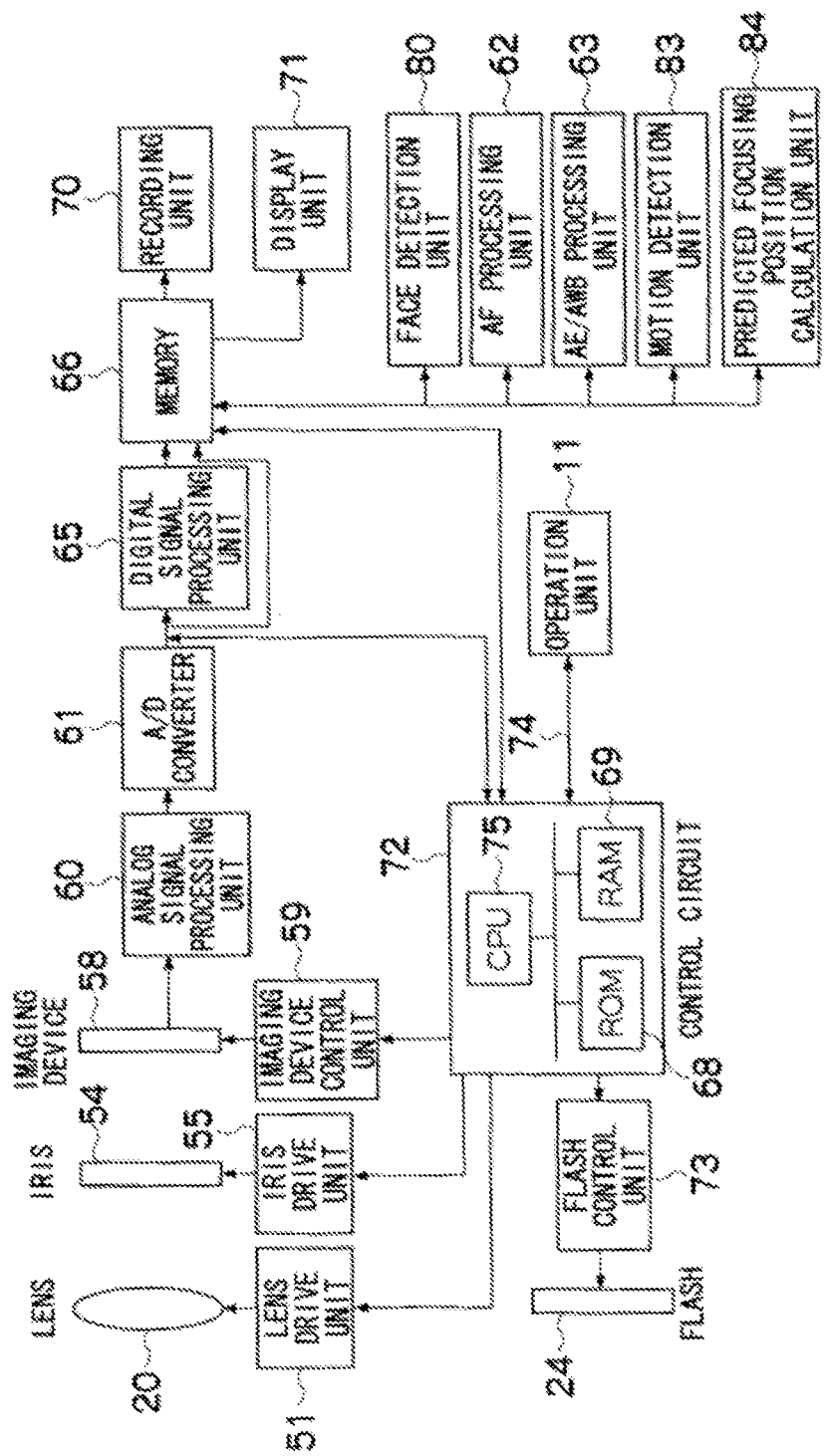
FIG. 1 is a schematic block diagram showing a configuration of a camera.

FIG. 1 is a schematic block diagram showing a configuration of a camera 1 (digital camera) as an example of an image pickup apparatus according to the present invention. The camera 1 converts image data obtained by photography into an image file of Exif format, and records the file in a recording unit 70 such as an external recording medium that can be attached to and detached from the camera.

The digital camera 1 has an operational system that includes: an operation unit 11 having an operation mode switch, a menu/OK button, a zoom/up-down lever, a right-left button, a Back (return) button, a display switching button, a release button, a power switch and the like; and an operational system control unit 74 as an interface for sending the operation performed on the operation unit 11 to a CPU (Central Processing Unit) 75.

A lens 20 includes a focus lens and a zoom lens. The lens 20 can be slid along an optical axis by a lens drive unit 51. The lens drive unit 51 controls movement of the focus lens or the zoom lens based on focus drive amount data or operated amount data of the zoom/up-down lever on the operation unit 11, both of which are output from the CPU 75.

An iris 54 is driven by an iris drive unit 55 including a motor and a motor driver. The iris drive unit 55 adjusts a diameter of the iris based on iris-value data output from an AE/AWB processing unit 63.

An imaging device 58 such as a CCD (Charge Coupled Device) is located at the rear of an image pickup optical system that includes the lens 20 and the iris 54. The imaging device 58 has a photoelectric surface on which a plurality of light receiving devices are arranged two-dimensionally. A light from the subject passing through the optical system forms an image on the photoelectric surface and is subjected to photoelectric conversion. Located in front of the photoelectric surface are, a micro-lens array for focusing the light on each pixel and a color filter array on which filters for R, G, and B colors are regularly arranged. The imaging device 58 outputs an electric charge stored at each of the pixels as a serial analog image signal for each line in synchronization with a vertical transfer clock and a horizontal transfer clock supplied from an imaging device control unit 59. A time required by a process of storing the electric charge at each of the pixels, that is, an exposure time is determined by an electronic shutter drive signal provided by the imaging device control unit 59.

The analog image signal output from the imaging device 58 is input to an analog signal processing unit 60. The analog signal processing unit 60 includes a correlated double sampling (CDS) circuit for removing noise from the image signal, and an automatic gain controller (AGC) for adjusting a gain of the image signal.

An A/D converter 61 converts the analog image signal that is processed through the analog signal processing unit 60 into a digital image signal (hereinafter, referred to as "image data"). The image data is CCD-RAW data having density values of R, G, and B colors for each of the pixels.

A control circuit 72 generates a timing signal, feeds the timing signal to the imaging device control unit 59, and synchronizes operation on the release button in the operation unit 11, input of the electric charge of the imaging device 58 and processing by the analog signal processing unit 60.

A flash control unit 73 causes a flash 24 to emit the light at the time of photography. Specifically, when the flash emission mode is set to flash-on, the flash control unit 73 turns on the flash 24 to emit the light at the time of photography. When the flash emission mode is set to flash-off, the flash control unit 73 disables the flash 24 from emitting the light at the time of photography.

The image data output from the A/D converter 61 is subjected to white-balance (WB) adjustment, gamma correction, and YC processing at a digital signal processing unit 65, and written to a memory 66. The CCD-RAW data is also written to the memory 66.

The memory 66 is a memory used as workspace for various kinds of digital image processing on the image data. The memory 66 may be an SDRAM (Synchronous Dynamic Random Access Memory) that carries out data transfer in synchronization with a bus clock signal of a predetermined period, for example.

A display unit 71 is used for displaying the image data that is serially stored in the memory 66 since the photography mode is set until the photography instruction is issued as through images, and for displaying the image data saved in the recording unit 70 in the playback mode. The through image is photographed by the imaging device 58 at predetermined intervals when the photography mode is on.

An AF processing unit 62 and the AE/AWB processing unit 63 determine a photography condition based on the image data.

The AF processing unit 62 detects the focusing position based on the image data and outputs the focus drive amount data (AF processing). For detecting the focusing position, a contrast detection method is adopted. The method takes advantage of such a nature of the image as having higher contrast in the accurate focus in detecting the focusing position. The AF processing unit 62 obtains an AF evaluation value by extracting high frequency components from the image data and summing them for the entire image or a part of the entire image (such as a center part or a face detecting region). The AF processing unit 62 detects the focus lens position where the AF evaluation value that indicates the contrast reaches the local maximum by moving the focus lens position in the lens 20 (also referred to as "focus position")

with the lens drive unit 51. The AF processing unit 62 determines the detected focus lens position as the focusing position. In the present invention, the AF evaluation value may also be referred to as "contrast evaluation value" or "focusing evaluation value".

The AE/AWB processing unit 63 measures the subject luminance based on the image data, and determines an iris value, a shutter speed, and the like based on the measured subject luminance. The AE/AWB processing unit 63 determines the iris value data and the shutter speed data as exposure setting values (AE processing). The AE/AWB processing unit 63 also determines the amount of correction performed on the white-balance of the image data based on the image data (AWB processing).

A ROM 68 stores various constants set in the camera 1, a program the CPU 75 runs and the like. A RAM 69 temporarily stores data needed by the CPU 75 in running a program.

The CPU 75 controls each of the units of the camera 1.

A face detection unit 80 detects a human face from the image data. Specifically, the face detection unit 80 detects a region in a face having characteristics of face (for example, the skin color, a particular part of the face such as eyes, and the face shape), as a face region, which is not necessarily limited to this method.

Figure 3A:
FIGS. 3A, 3B, and 3C are illustrations used for explaining face directions.
Figure 3B:
Figure 3C:
Figure 4A:
FIGS. 4A, 4B, 4C, and 4D are illustrations used for explaining face angles.
Figure 4B:
Figure 4C:
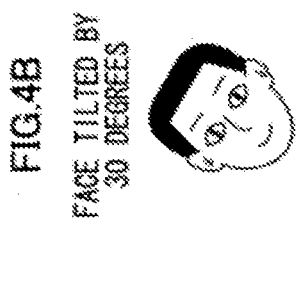
Figure 4D:
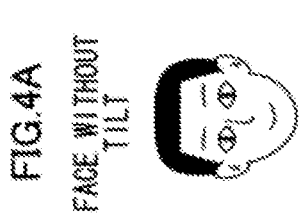

The face detection unit 80 also detects the face size in the image data. In an entire image 201 (also referred to as "screen") shown in FIG. 2, the ratio (Lf/Lv) is calculated as the face size information where Lv is the number of pixels counted in the vertical direction of the entire image 201 and Lf is the number of pixels counted lengthwise of the face region 202. Specifically, the ratio of a dimension of the face image to a dimension of the entire image 201 is calculated as the face size information. Although FIG. 2 shows a simple example for facilitating the understanding of the present invention, the face may be looking into any direction such as looking left, looking front, looking right as shown in FIG. 3A to 3C. The face may be tilted at any angle as shown in FIG. 4A to 4D. Therefore, the face information to be obtained here needs to be the same for the same distance from the subject, dependent neither on the direction nor on the tilted angle. It may be preferable to obtain the length of the face after detecting the direction and the tilted angle of the face based on physical relationships between the face parts (eyes, mouth and the like). Alternatively, the ratio of a distance between the face parts (for example, a distance between the eyes and the mouth, a distance between the eyes, etc.) to the dimension in the entire image may be calculated as the face size information by using the distance between the face parts in the place of the dimension of the entire face. The direction, the tilted angle, and the size of the face may be detected by any known methods including that disclosed by the applicant in the Japanese Patent Application Laid-Open No. 2007-34261.

A motion detection unit 83 detects a motion of the subject based on the image data. Specifically, the motion detection unit 83 obtains a motion vector in the face area (face region) of the image data. The motion vector indicates the direction and the speed of the motion of the face area in the image data (the speed relative to the image pickup apparatus).

A predicted focusing position calculation unit 84 calculates a predicted focusing position where the image is predicted to be in focus for the focus lens position (focus position) in the lens 20. The specific calculation will be detailed later.

Although the embodiment has been described by taking an example of the case where a face is the target to be focused, the target is not limited to the face and may be other than the face. It is needless to say that the camera may be provided with a detection unit for targets other than the face and a detection unit for a motion of targets other than the face.

The CPU 75 in the control circuit 72 may function as the AF processing unit 62, the AE/AWB processing unit 63, the face detection unit 80, the motion detection unit 83, and the predicted focusing position calculation unit 84.

Various focusing processing will be detailed below with reference to respective embodiments.

First Embodiment

Figure 5:
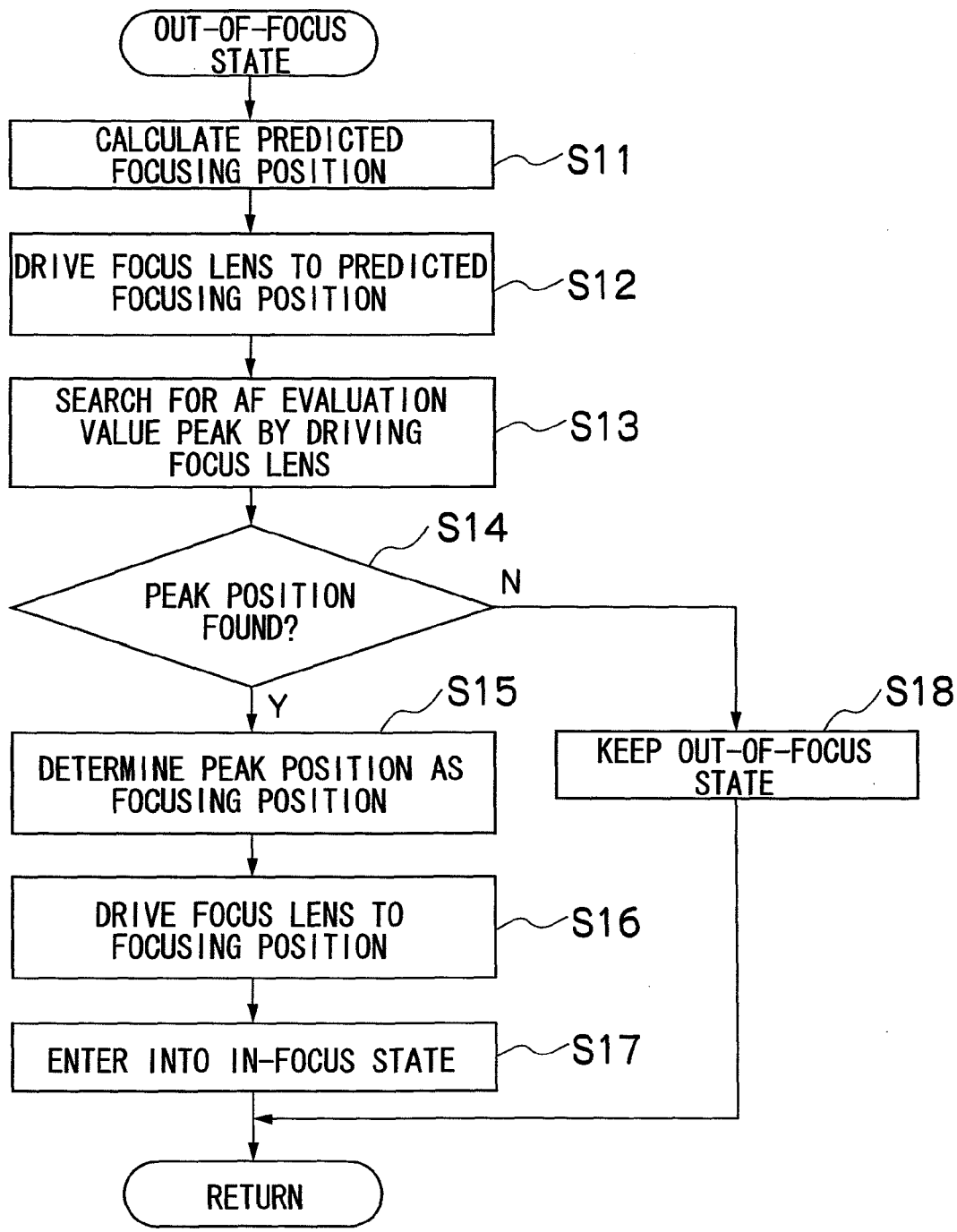
FIG. 5 is a flowchart showing exemplary focusing processing according to a first embodiment.

FIG. 5 is a flowchart showing a flow of exemplary focusing processing according to the first embodiment in an out-of-focus state. The focusing processing is performed by the AF processing unit 62 under general control of the CPU 75 of the camera 1.

At step S11, the AF processing unit 62 calculates the predicted focusing position (the focus lens position where the image becomes in focus) of the lens 20 by the predicted focusing position calculation unit 84. In the embodiment, the target is a face whose predicted focusing position is calculated from the size of the face area detected by the face detection unit 80.

At step S12, the AF processing unit 62 slides the focus lens to the predicted focusing position by the lens drive unit 51.

At step S13, the AF processing unit 62 searches for the focus lens position where the AF evaluation value that indicates the contrast in the image reaches the local maximum (hereinafter, referred to as "peak position") by moving the focus lens position away from the predicted focusing position with the lens drive unit 51.

At step S14, the AF processing unit 62 judges whether or not the peak position is found. If the peak position is found, the operation proceeds to step S15. If the peak position is not found, the operation proceeds to step S18.

At step S15, the AF processing unit 62 determines the peak position as the focusing position.

At step S16, the AF processing unit 62 slides the focus lens to the focusing position (i.e., the peak position) by the lens drive unit 51.

At step S17, the AF processing unit 62 sets a focusing state flag on. Hereinafter, the state where the focusing state flag is set on is referred to as "in-focus state".

At step S18, the AF processing unit 62 keeps the out-of-focus state. The out-of-focus state refers to a state where the focusing state flag is set off.

Figure 6:
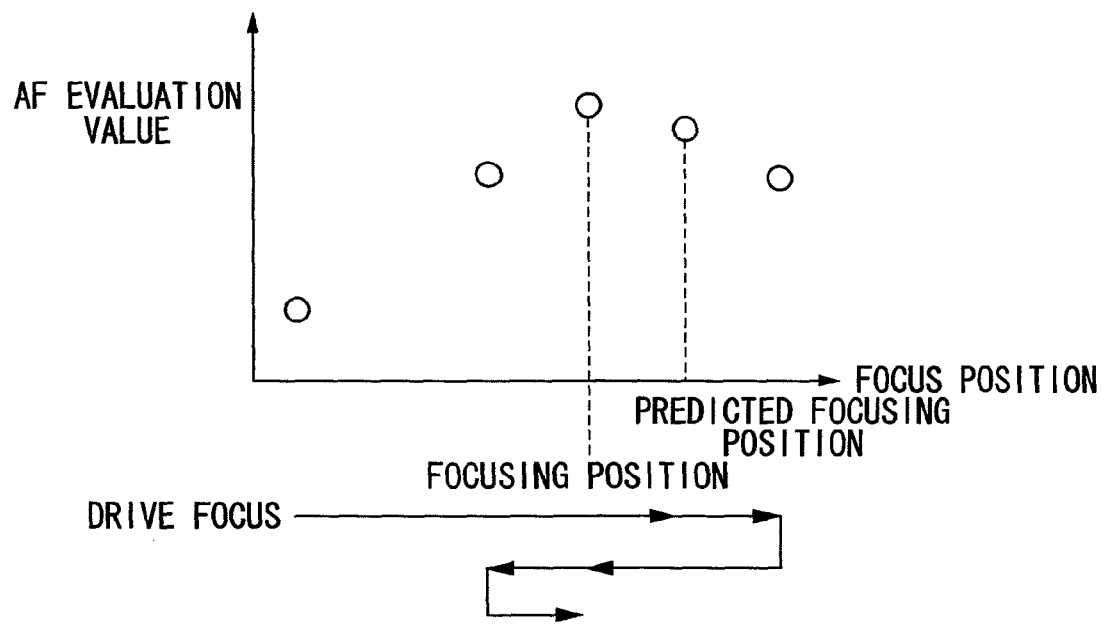
FIG. 6 is a diagram showing an exemplary focusing position in the first embodiment.

FIG. 6 exemplifies a relationship between the focus lens positions and the AF evaluation values and how the focus lens is driven (focus driving) in the embodiment. In the embodiment, the AF processing unit 62 detects the focusing position based on the AF evaluation values by moving the focus lens position away from the predicted focusing position.

First, the AF processing unit 62 calculates the predicted focusing position, and then slides the focus lens to the predicted focusing position. Next, the AF processing unit 62 obtains the AF evaluation values near the predicted focusing position and finds the focus lens position where the AF evaluation value reaches the peak (peak position). The AF processing unit 62 determines the found peak position as the focusing position and slides the focus lens to the focusing position.

Figure 7:
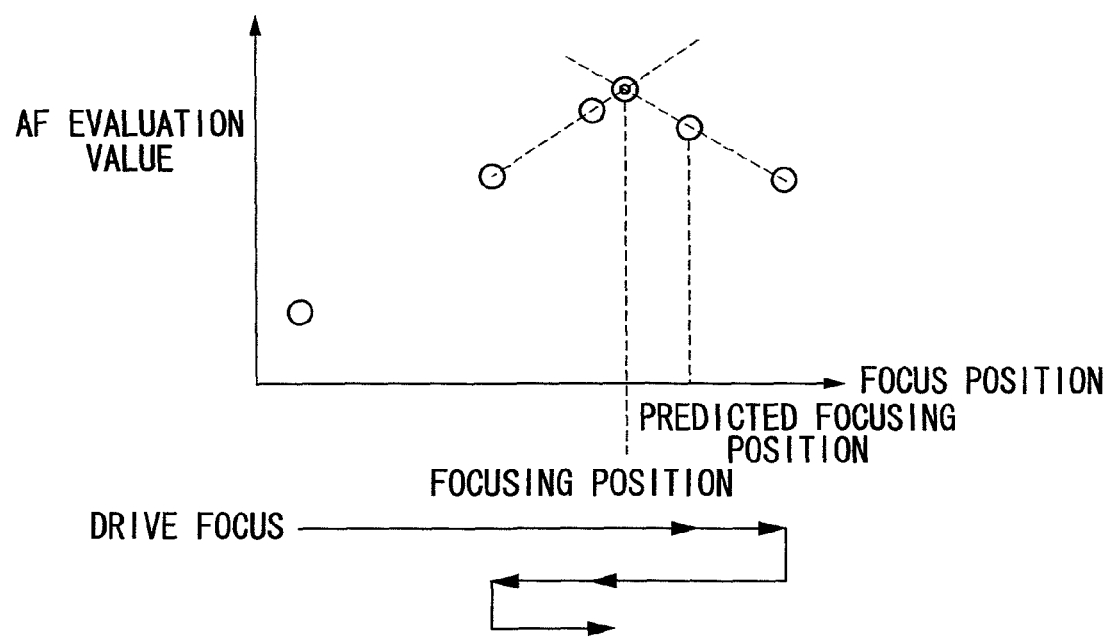
FIG. 7 is a diagram showing the focusing position determined by interpolation in the first embodiment.

FIG. 7 exemplifies a relationship between the focus lens positions and the AF evaluation values and how the focus lens is driven (focus driving) in the case where the focusing position is detected with higher accuracy by taking finer step width than that taken to slide the focus lens in detecting the peak position. With interpolation to obtain the AF evaluation values by using the AF evaluation values at adjoining focus positions and the focus positions, the focusing position is calculated.

Second Embodiment

Figure 8:
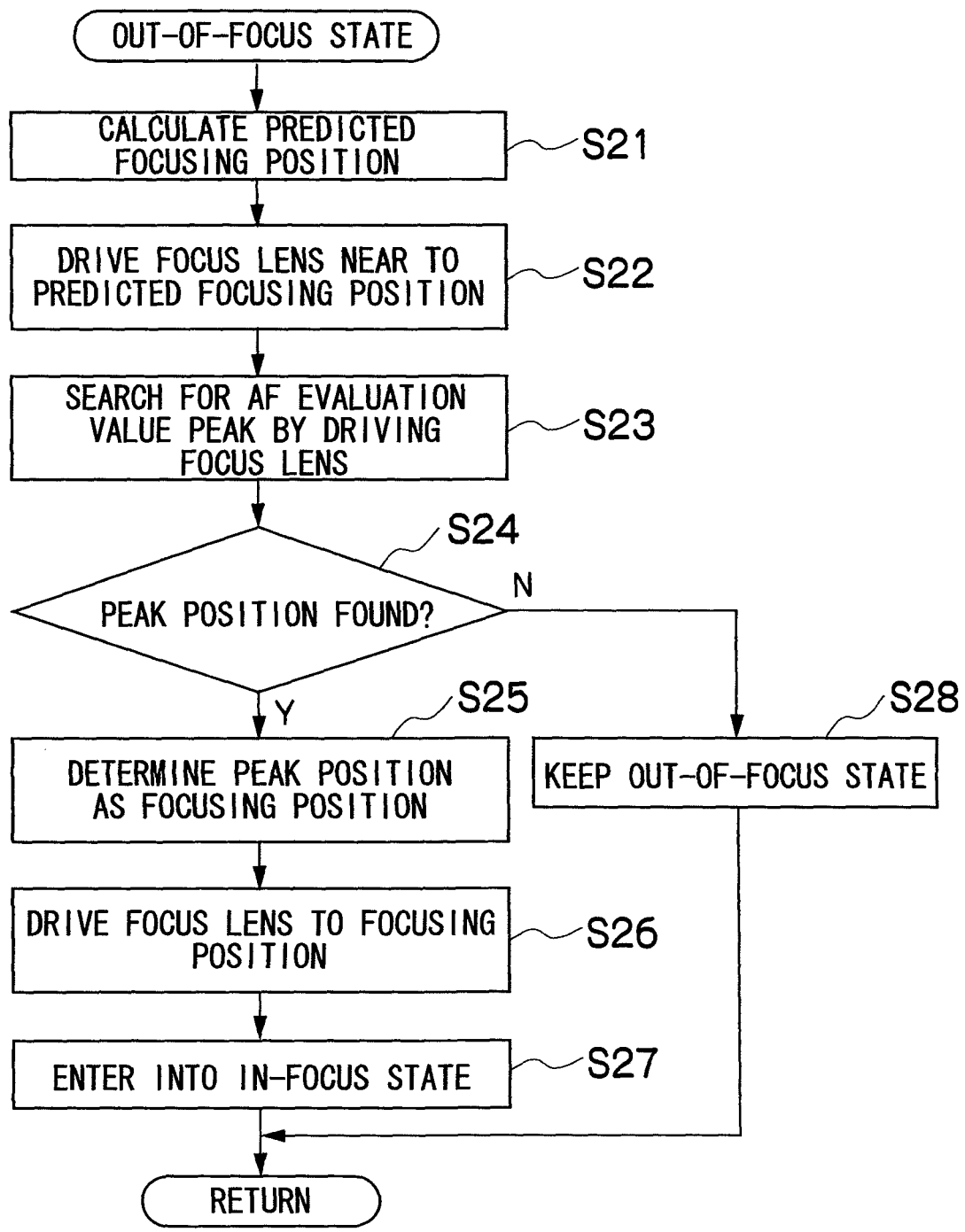
FIG. 8 is a flowchart showing exemplary focusing processing according to a second embodiment.

FIG. 8 is a flowchart showing a flow of exemplary focusing processing according to the second embodiment in an out-of-focus state. The processing is performed by the AF processing unit 62 under general control of the CPU 75 of the camera 1.

Step S21 is the same as step S11 of the first embodiment.

At step S22, the AF processing unit 62 slides the focus lens near to the predicted focusing position (hereinafter, referred to as "initial target position") by the lens drive unit 51.

At step S23, the AF processing unit 62 searches for the focus lens position where the AF evaluation value that indicates the contrast in the image reaches the local maximum (peak position) by moving the focus lens position from the initial target position toward the predicted focusing position with the lens drive unit 51.

Steps S24 to S28 are the same as steps S14 to S18 of the first embodiment.

Figure 9:
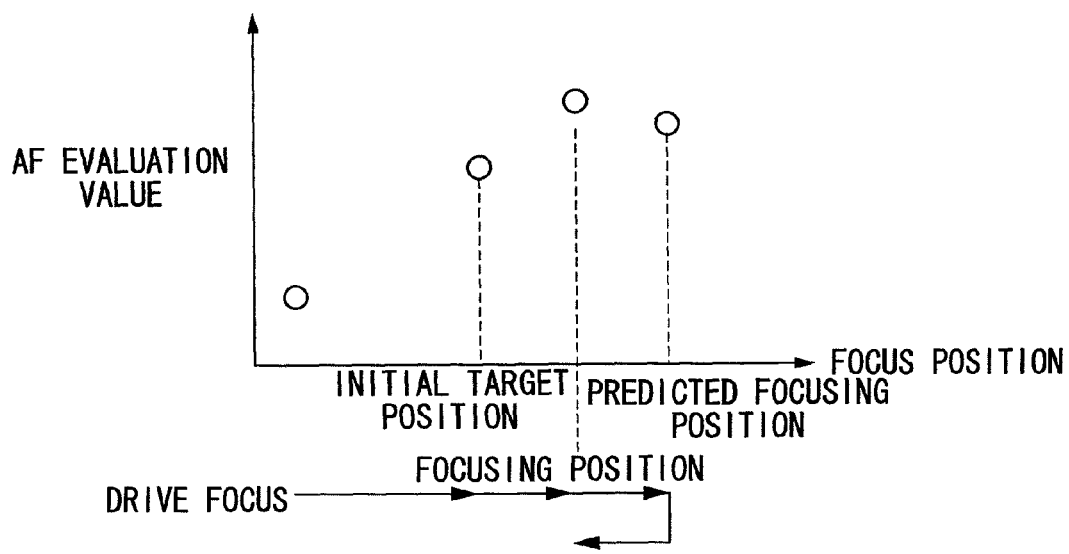
FIG. 9 is a diagram showing an exemplary focusing position in the second embodiment.

FIG. 9 exemplifies a relationship between the focus lens positions and the AF evaluation values and how the focus lens is driven (focus driving) in the embodiment. In the embodiment, the AF processing unit 62 detects the focusing position based on the AF evaluation values by moving the focus lens position from the initial target position near the predicted focusing position toward the predicted focusing position.

First, the AF processing unit 62 calculates the predicted focusing position, sets the position near the predicted focusing position as the initial target position, and slides the focus lens to the initial target position. Next, the AF processing unit 62 obtains the AF evaluation values near the predicted focusing position and finds the focus lens position where the AF evaluation value reaches the peak (peak position). The AF processing unit 62 determines the found peak position as the focusing position and slides the focus lens to the focusing position.

In some cases, the number of times to reverse the direction of sliding the focus lens may be less than the first embodiment shown in FIG. 6. That means that the focus tracking ability may be better than that of the first embodiment.

Figure 10:
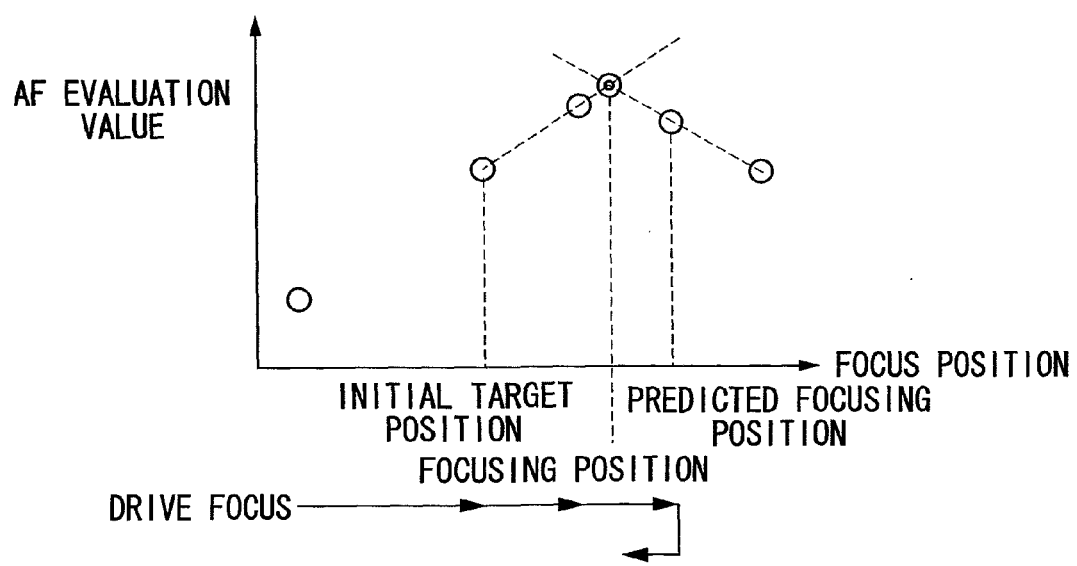
FIG. 10 is a diagram showing the focusing position determined by interpolation in the second embodiment.

FIG. 10 exemplifies a relationship between the focus lens positions and the AF evaluation values and how the focus lens is driven (focus driving) in the case where the focusing position is detected with higher accuracy by taking finer step width than that taken to slide the focus lens in detecting the peak position. With interpolation to obtain the AF evaluation values by using the AF evaluation values at adjoining focus positions and the focus positions, the focusing position is calculated.

Third Embodiment

Figure 11:
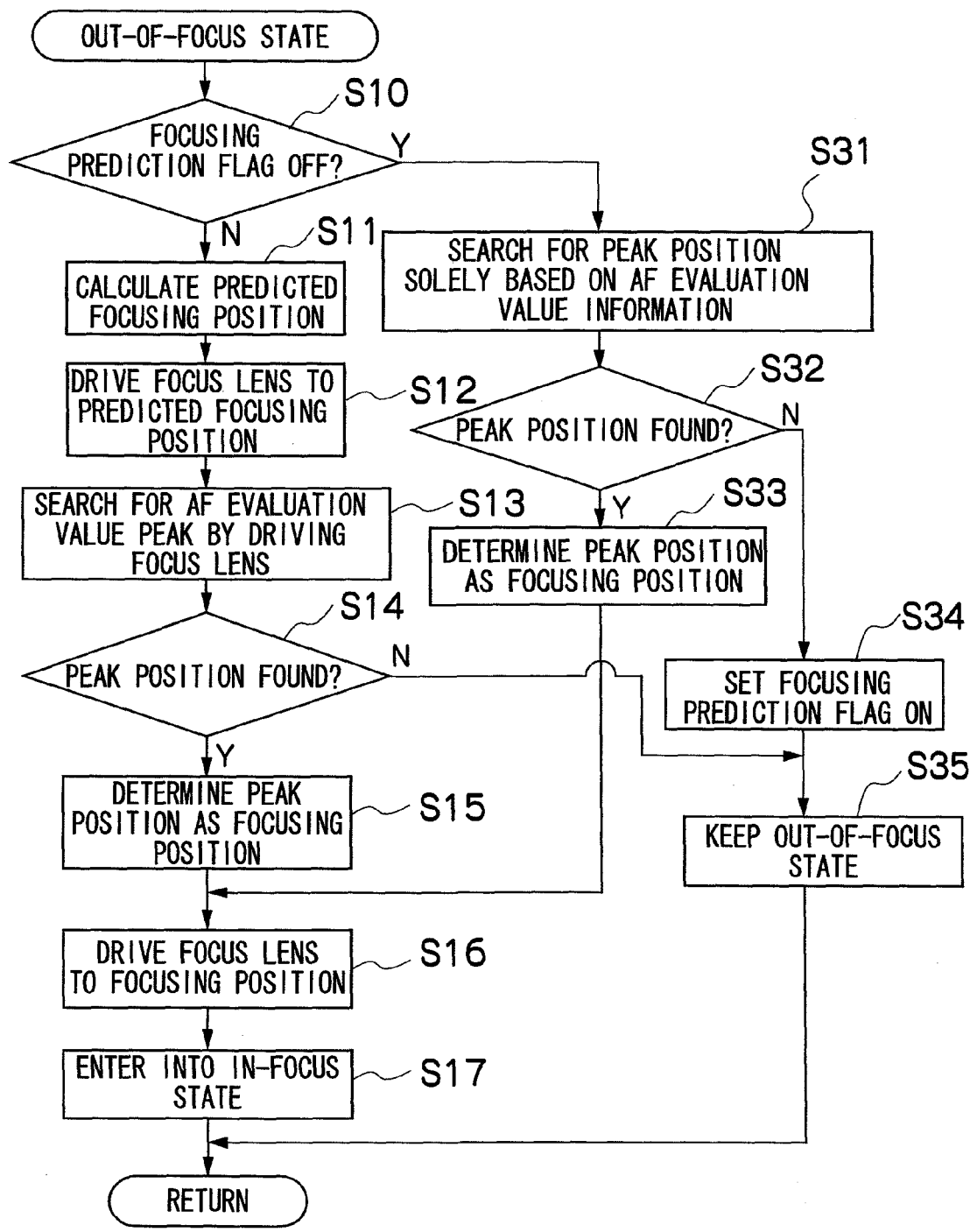
FIG. 11 is a first flowchart showing exemplary focusing processing according to a third embodiment.

FIG. 11 is a flowchart showing a flow of exemplary focusing processing according to the third embodiment in an out-of-focus state. The processing is performed by the AF processing unit 62 under general control of the CPU 75 of the camera 1. In FIG. 11, the steps same as those in the first embodiment shown in FIG. 5 are designated by the same reference symbols and the detailed description of the steps is omitted.

At step S10, the AF processing unit 62 judges whether a focusing prediction flag is off or not. The focusing prediction flag is set on as the default. The case where the focusing prediction flag is set off will be described later. If the focusing prediction flag is set on, the operation proceeds to step S11. If the focusing prediction flag is set off, the operation proceeds to step S31.

Steps S11 to S14 are the same as those in the first embodiment.

If the peak position is found, the operation proceeds to step S15. If the peak position is not found, the operation proceeds to step S35.

Steps S15 to S17 are the same as those in the first embodiment.

If the focusing prediction flag is off, the AF processing unit 62 neither calculates the predicted focusing position (step S11) nor slides the focus lens to the predicted focusing position (step S12). That means that the focus lens 10 is not slid in accordance with the face size in the image when the focusing prediction flag is off.

If the focusing prediction flag is off, the AF processing unit 62 does not slide the focus lens to the predicted focusing position, and at step S31, searches for the peak position based on the AF evaluation values. Specifically, the AF processing unit 62 searches for the peak position where the AF evaluation value reaches the local maximum by moving the focus lens position away from the present position with the lens drive unit 51.

At step S32, the AF processing unit 62 judges whether the peak position is found or not. If the peak position is found, the operation proceeds to step S33. If the peak position is not found, the operation proceeds to step S34.

At step S33, the AF processing unit 62 determines the peak position as the focusing position, and then the operation proceeds to step S16.

At step S34, the AF processing unit 62 sets the focusing prediction flag on. At step S35, the AF processing unit 62 keeps the out-of-focus state.

Figure 12:
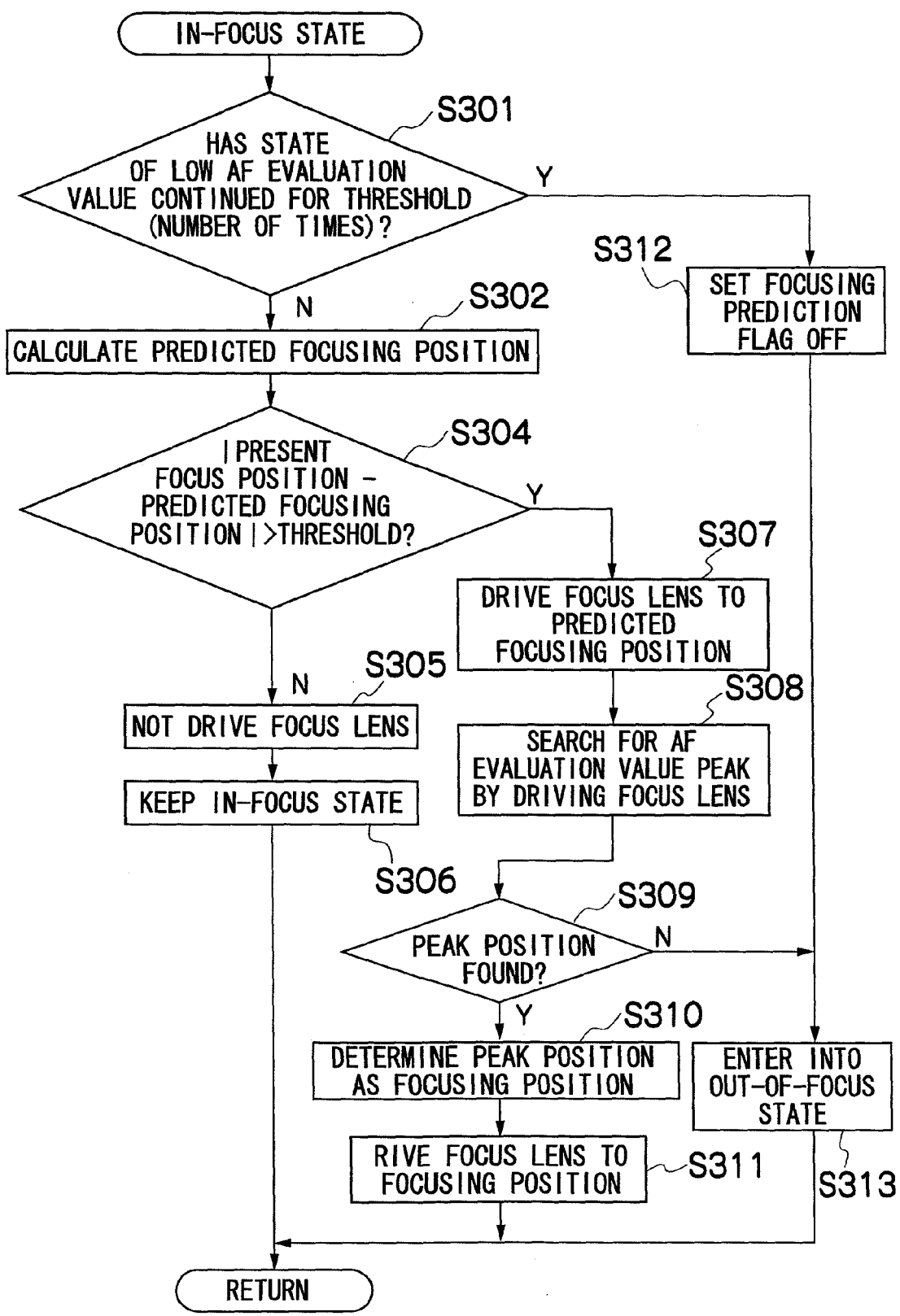
FIG. 12 is a second flowchart showing exemplary focusing processing according to the third embodiment.

FIG. 12 is a flowchart showing a flow of exemplary focusing processing according to the third embodiment in an in-focus state. The processing is performed by the AF processing unit 62 under general control of the CPU 75 of the camera 1.

At step S301, the AF processing unit 62 judges whether a state of a low AF evaluation value has continued in time series or not. Specifically, the AF processing unit 62 judges whether a state of the image with low contrast has continued for the number of image pickup times (or a certain period of time, or the number of determinations), indicated by a threshold, or more.

If the state of the low AF evaluation value has continued, the operation proceeds to step S312. If the state of the low AF evaluation value has not continued, the operation proceeds to step S302.

At step S302, the AF processing unit 62 calculates the predicted focusing position based on the size of the target in the image (for example, a face) with the predicted focusing position calculation unit 84.

At step S304, the AF processing unit 62 judges whether a difference (an absolute value) between the present focus lens position and the predicted focusing position is larger than a motion judgment threshold or not. In the present invention, the focus lens position may also be referred to as "FOCUS position" or "focus position". For the motion judgment threshold, a value corresponding to the depth of field is used.

If the difference is larger than the motion judgment threshold, it is determined that the present focus lens position cannot keep the in-focus state. Specifically, the AF processing unit 62 determines that the focus lens needs to be slid to a suitable position if the difference is outside the range of the depth-of-field correspondent values.

If the difference is judged as larger than the motion judgment threshold at the step S304, the operation proceeds to step S307. If the difference is judged as equal to or less than the motion judgment threshold at the step S304, the operation proceeds to step S305.

At step S307, the AF processing unit 62 slides the focus lens to the predicted focusing position by the lens drive unit 51.

At step S308, the AF processing unit 62 searches for the peak position where the AF evaluation value reaches the local maximum by sliding the focus lens.

At step S309, the AF processing unit 62 judges whether the peak position is found or not. If the peak position is found, the operation proceeds to step S310. If the peak position is not found, the operation proceeds to step S313.

At step S310, the AF processing unit 62 determines the peak position as the focusing position. At step S311, the AF processing unit 62 slides the focus lens to the focusing position (i.e., the peak position).

If the difference is judged as equal to or less than the motion judgment threshold at the step S304, the AF processing unit 62 does not slide the focus lens (step S305) and keeps the in-focus state (step S306). Specifically, if the AF processing unit 62 judges that the difference between the present focus position and the predicted focusing position is within the range of the depth-of-field correspondent values, the AF processing unit 62 does not slide the focus lens. That can prevent the focus lens from being unstably driven (shaken or the like) in the in-focus state.

If the AF processing unit 62 judges that the state of the low AF evaluation value has continued at step S301, the AF processing unit 62 sets the focusing prediction flag off at step S312 and enters into the out-of-focus state at step S313. In the out-of-focus state, i.e., if the focusing prediction flag is off as described with reference to FIG. 11, the AF processing unit 62 does not calculate the predicted focusing position (step S11 in FIG. 11) and determines the focusing position based on the AF evaluation values (step S31 in FIG. 11).

Here, after the AF processing unit 62 detects the focusing position by using the predicted focusing position in the out-of-focus state, the state of the low AF evaluation value (the state of the low contrast) may continue. That may occur in such a case where the AF processing unit 62 predicts that a position largely different from the correct focusing position will be the focusing position. It is assumed that an image of a face printed on a business card is picked up. As the face printed on the business card is much smaller than the actual face, the AF processing unit 62 may calculate the position quite different from the correct focusing position as the predicted focusing position. In addition, if the AF processing unit 62 finds a peak caused by a noise or the like near such a wrong predicted focusing position, the AF processing unit 62 slides the focus lens to a position largely different from the correct focusing position. In order to cope with the situation, the embodiment is adapted to disable the focusing position prediction, only perform the focusing position detection based on the AF evaluation value and slide the focus lens to the detected focusing position, if the state of the low AF evaluation value continues.

Fourth Embodiment

Figure 13:
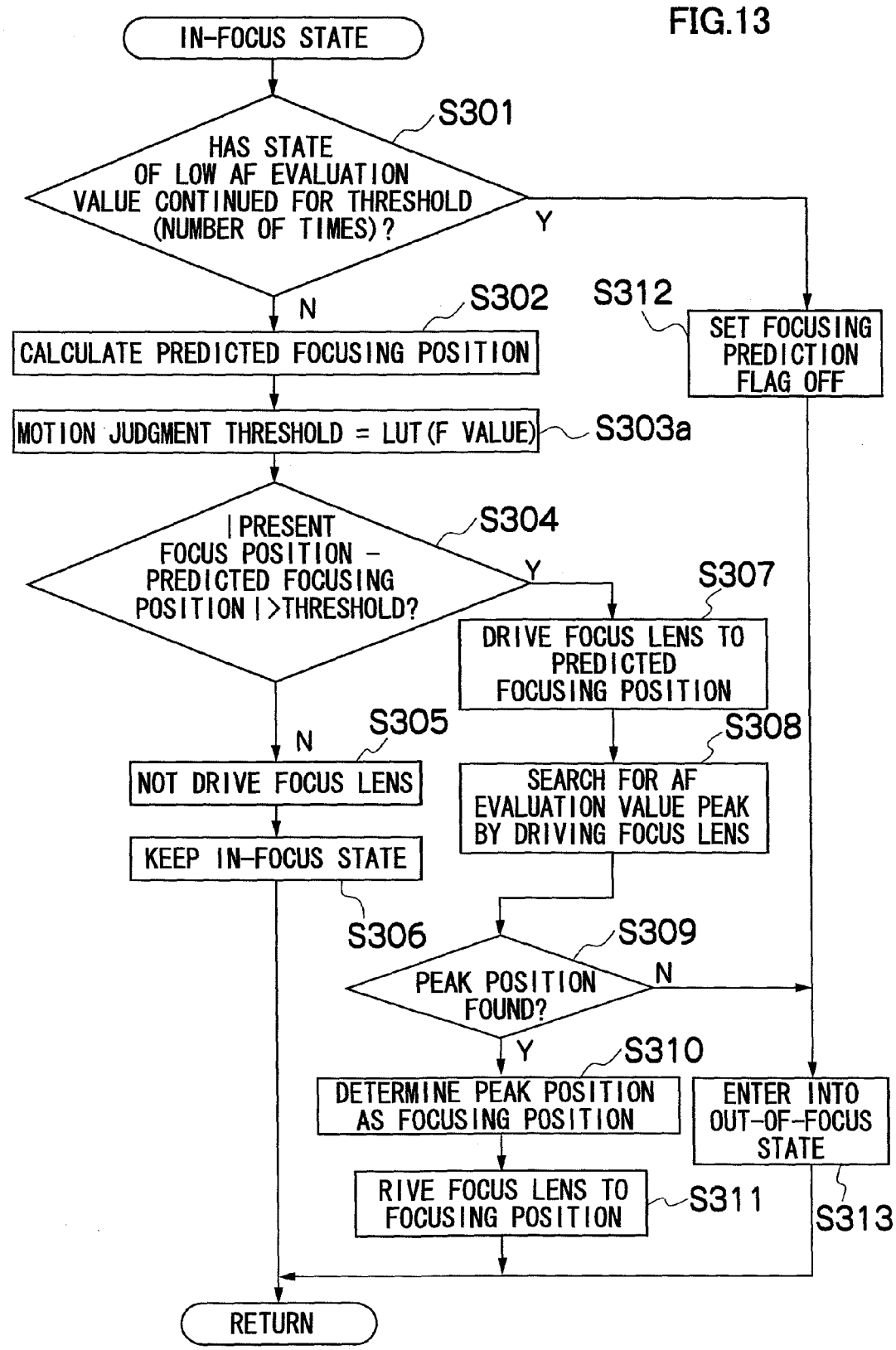
FIG. 13 is a flowchart showing exemplary focusing processing according to a fourth embodiment.

FIG. 13 is a flowchart showing a flow of focusing processing according to the fourth embodiment in an in-focus state. The processing is performed by the AF processing unit 62 under general control of the CPU 75 of the camera 1. In FIG. 13, the steps same as those in the third embodiment shown in FIG. 12 are designated by the same reference symbols and the detailed description of the steps is omitted.

Steps S301 to S302 and steps S304 to S312 are the same as those in the third embodiment.

In the in-focus state, the AF processing unit 62 keeps obtaining size information on the target (for example, the face) in the image and calculating the predicted focusing position. While performing the processing, the AF processing unit 62 obtains the threshold for judging whether the focus lens position is to be moved or not (motion judgment threshold) at step S303a.

In the embodiment, a LUT (lookup table) showing a relationship between iris F values and motion judgment thresholds is stored in the control circuit 72 in advance. The motion judgment threshold corresponding to the present iris F value (iris value) is obtained from the LUT. If the difference between the present focus lens position and the predicted focusing position is equal to or less than the motion judgment threshold, the focus lens is not driven (step S305). That means if the difference is judged as within the range of the depth of field, the focus lens is not driven.

The depth of field varies according to the iris F value. In the in-focus state, the AF processing unit 62 can perform accurate focus control by changing the motion judgment threshold for judging whether the focus lens position is to be moved or not according to the present iris F value.

Fifth Embodiment

Figure 14:
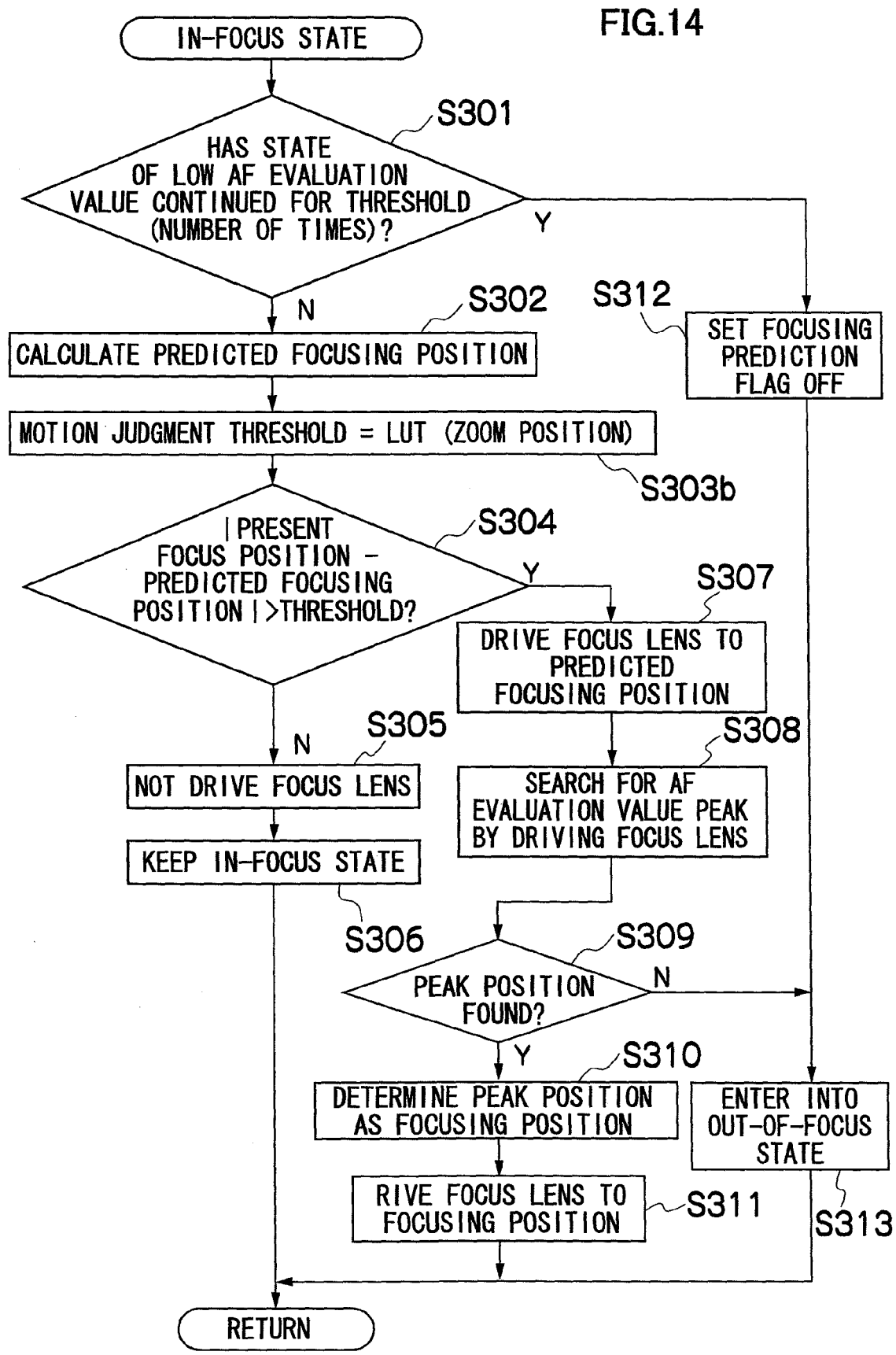
FIG. 14 is a flowchart showing exemplary focusing processing according to a fifth embodiment.

FIG. 14 is a flowchart showing a flow of focusing processing according to the fifth embodiment in an in-focus state. The processing is performed by the AF processing unit 62 under general control of the CPU 75 of the camera 1. In FIG. 14, the steps same as those in the third embodiment shown in FIG. 12 are designated by the same reference symbols and the detailed description of the steps is omitted.

Steps S301 to S302 and steps S304 to S313 are the same as those in the third embodiment.

In the in-focus state, the AF processing unit 62 keeps obtaining size information on the target (for example, the face) in the image and calculating the predicted focusing position. While performing the processing, the AF processing unit 62 obtains the threshold for judging whether the focus lens position is to be moved or not (motion judgment threshold) at step S303b.

In the embodiment, a LUT (lookup table) showing a relationship between the zoom lens positions corresponding to the focal lengths and motion judgment thresholds is stored in the control circuit 72 in advance. The motion judgment threshold corresponding to the present zoom position is obtained from the LUT. In the present invention, the zoom lens position may be referred to as "zoom position". If the difference between the present focus lens position and the predicted focusing position is equal to or less than the motion judgment threshold, the focus lens is not driven (step S305). That means if the difference is judged as within the range of the depth of field, the focus lens is not driven.

The depth of field varies according to the zoom lens position (or the focal length). In the in-focus state, the AF processing unit 62 can perform accurate focus control by changing the motion judgment threshold for judging whether the focus lens position is to be moved or not according to the present zoom lens position (or the focal length).

Sixth Embodiment

Figure 15:
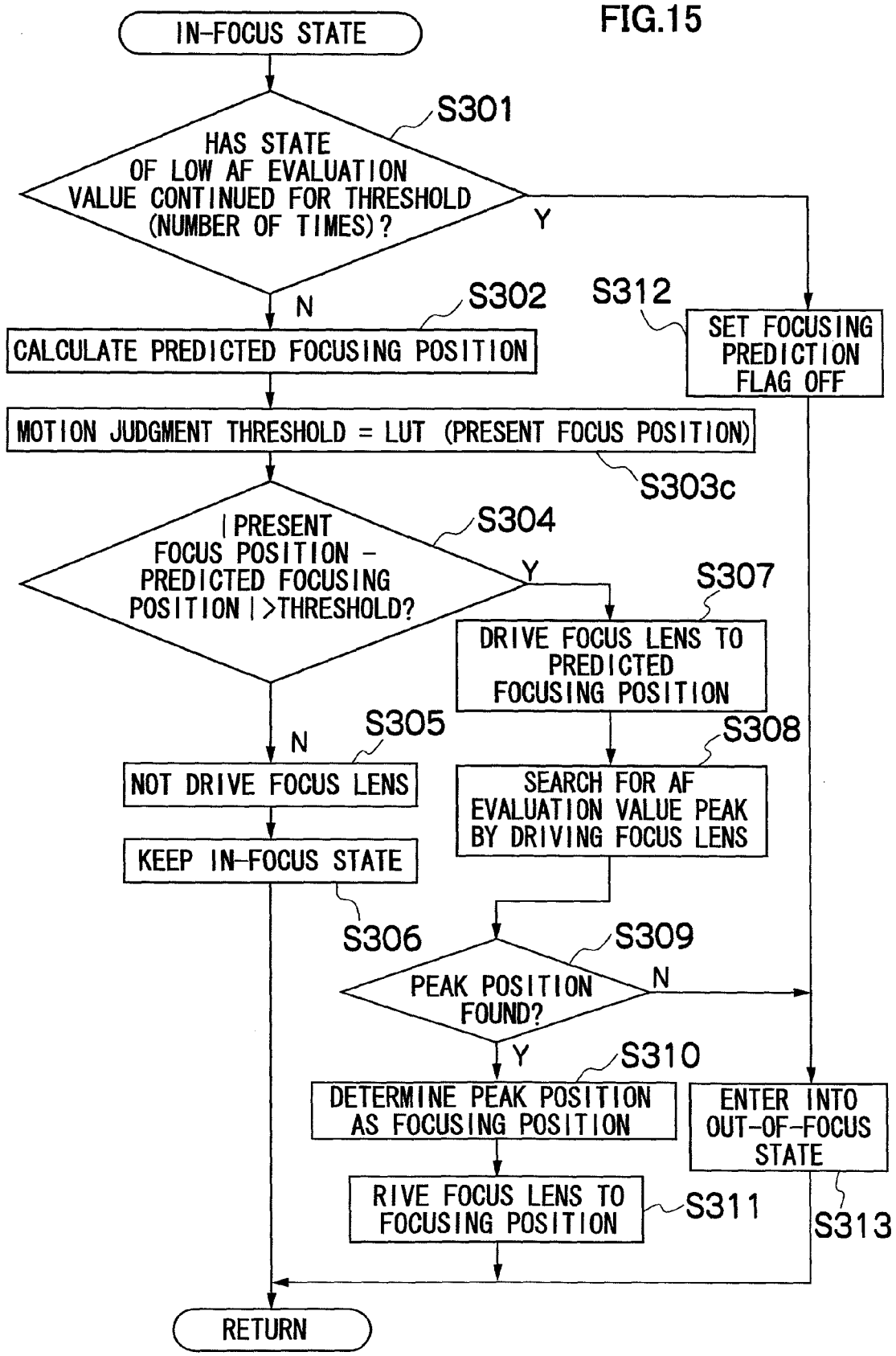
FIG. 15 is a flowchart showing exemplary focusing processing according to a sixth embodiment.

FIG. 15 is a flowchart showing a flow of focusing processing according to the sixth embodiment in an in-focus state.

The processing is performed by the AF processing unit 62 under general control of the CPU 75 of the camera 1. In FIG. 15, the steps same as those in the third embodiment shown in FIG. 12 are designated by the same reference symbols and the detailed description of the steps is omitted.

Steps S301 to S302 and steps S304 to S313 are the same as those in the third embodiment.

In the in-focus state, the AF processing unit 62 keeps obtaining size information on the target (for example, the face) in the image and calculating the predicted focusing position. While performing the processing, the AF processing unit 62 obtains the threshold for judging whether the focus lens position is to be moved or not (motion judgment threshold) at step S303c.

In the embodiment, a LUT (lookup table) showing a relationship between the focus lens positions and motion judgment thresholds is stored in the control circuit 72 in advance. The motion judgment threshold corresponding to the present focus lens position is obtained from the LUT. In the present invention, the focus lens position may be referred to as "FOCUS position" or "focus position". If the difference between the present focus lens position and the predicted focusing position is equal to or less than the motion judgment threshold, the focus lens is not driven (step S305). That means if the difference is judged as within the range of the depth of field, the focus lens is not driven.

The depth of field varies according to the focus lens position (or the subject distance). In the in-focus state, the AF processing unit 62 can perform accurate focus control by changing the motion judgment threshold for judging whether the focus lens position is to be moved or not according to the present focus lens position (or the subject distance).

Seventh Embodiment

When the subject (target) is moving, detecting the peak position based on the contrast in the image is inconvenient for the reasons below.

First, the AF processing unit 62 detects the focusing position by sliding the focus lens back and forth along the optical axis. Accordingly, the focus lens always reaches the focusing position a little bit later than the motion of the subject.

Second, when the subject is moving, the image is sometimes blurred and in a low contrast. For such an image, it cannot be expected to have accurate focusing position detection.

In order to cope with the situation, the embodiment is adapted to disable the peak position detection based on the contrast in the image and serially slide the focus lens to the predicted focusing position, if the subject is moving too fast. Accordingly, when the motion of the subject is too large, the embodiment sometimes cannot set the focus lens to the correct focusing position; though, the embodiment can make the focus lens follow the motion of the subject with focusing accuracy to some extent.

Figure 16:
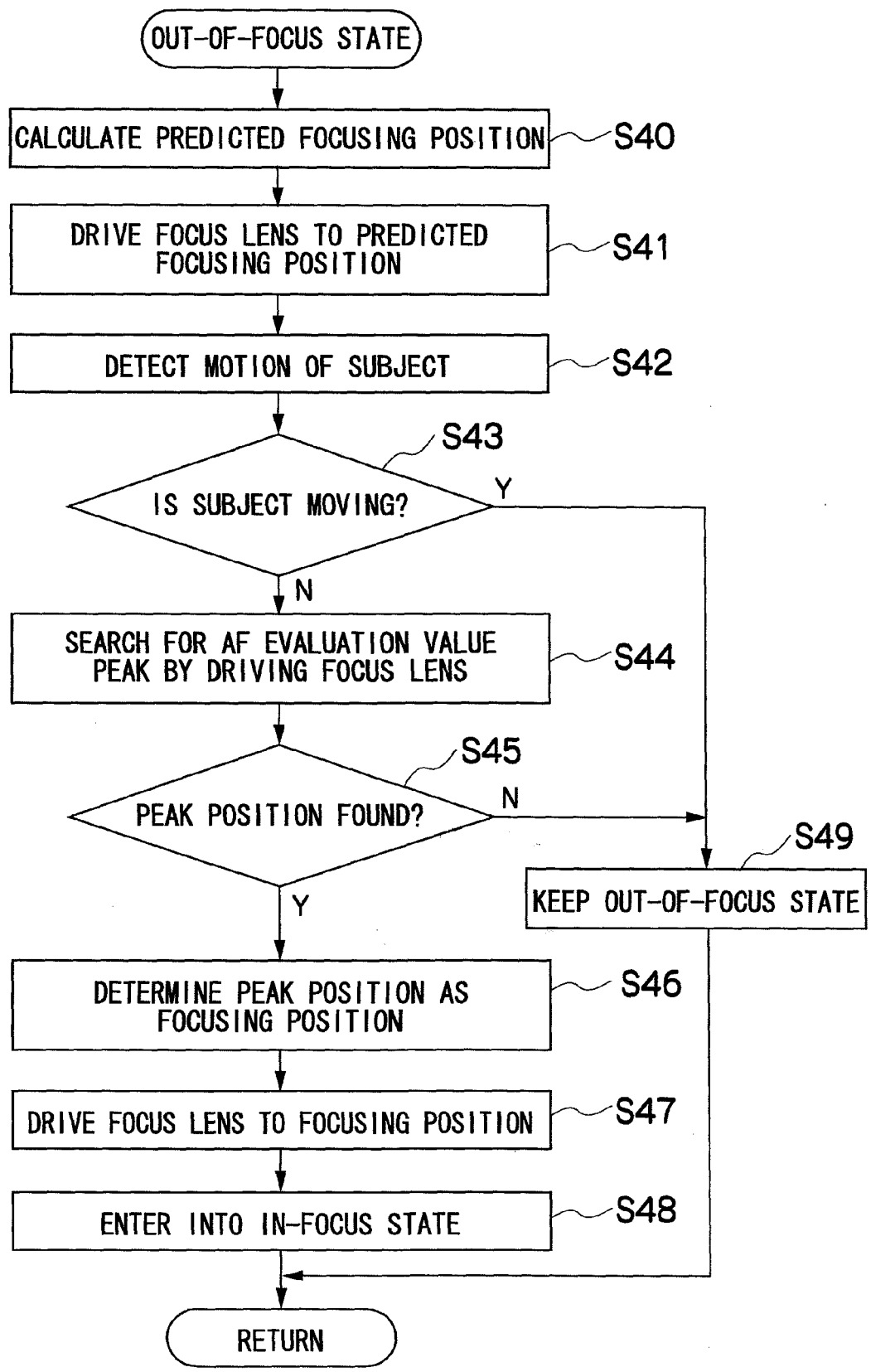
FIG. 16 is a flowchart showing exemplary focusing processing according to a seventh embodiment.

FIG. 16 is a flowchart showing a flow of focusing processing according to the seventh embodiment in an out-of-focus state. The processing is performed by the AF processing unit 62 under general control of the CPU 75 of the camera 1.

Steps S40 and S41 are the same as steps S11 and S12 of the first embodiment.

At step S42, the AF processing unit 62 detects the motion vector of the subject (target) with the motion detection unit 83. By detecting the motion vector of the subject, the AF processing unit 62 can detect the presence and the speed of the motion of the subject.

At step S43, the AF processing unit 62 judges whether the subject is moving fast or not. Specifically, the AF processing unit 62 compares the speed of the motion with the motion judgment threshold. If it is judged that the subject is moving fast (i.e., the difference between the present focus lens position and the predicted focusing position is larger than the motion judgment threshold), the operation proceeds to step S44. If it is judged that the subject is moving slow (or the subject is not moving), the operation proceeds to step S49.

At step S44, the AF processing unit 62 drives the focus lens with the lens drive unit 51 and searches for the peak position by sliding the focus lens away from the predicted focusing position.

At step S45, the AF processing unit 62 judges whether the peak position is found or not. When the peak position is found, the operation proceeds to step S46. When the peak position is not found, the operation proceeds to step S49.

At step S46, the AF processing unit 62 determines the peak position as the focusing position. At step S47, the AF processing unit 62 slides the focus lens to the focusing position with the lens drive unit 51. At step S48, the AF processing unit 62 sets the focusing state flag on. At step S49, the AF processing unit 62 keeps the out-of-focus state.

A nonlimiting example of a method for detecting the motion of the subject include a method of detecting the motion based on an image signal obtained by an image pickup unit. For example, the embodiment detects a target (for example, the face) as a primary subject, and then estimates an optical flow by using the correlation method or KLT based methods. The embodiment may be adapted to determine a motion from the amount of change in the photometric value or the amount of change in the AF evaluation value instead of installing a particular motion detection method.

Eighth Embodiment

The focusing position of the focus lens can be detected based on the contrast in the image with high accuracy for a static object but with a poor focus tracking ability for a moving object.

In order to cope with the situation, the embodiment is adapted to accept a selection input by the user as to which of the focusing speed and the focusing accuracy is prioritized, and based on the selection, switch enabling and disabling to detect the focusing position based on the contrast in the image.

Figure 17:
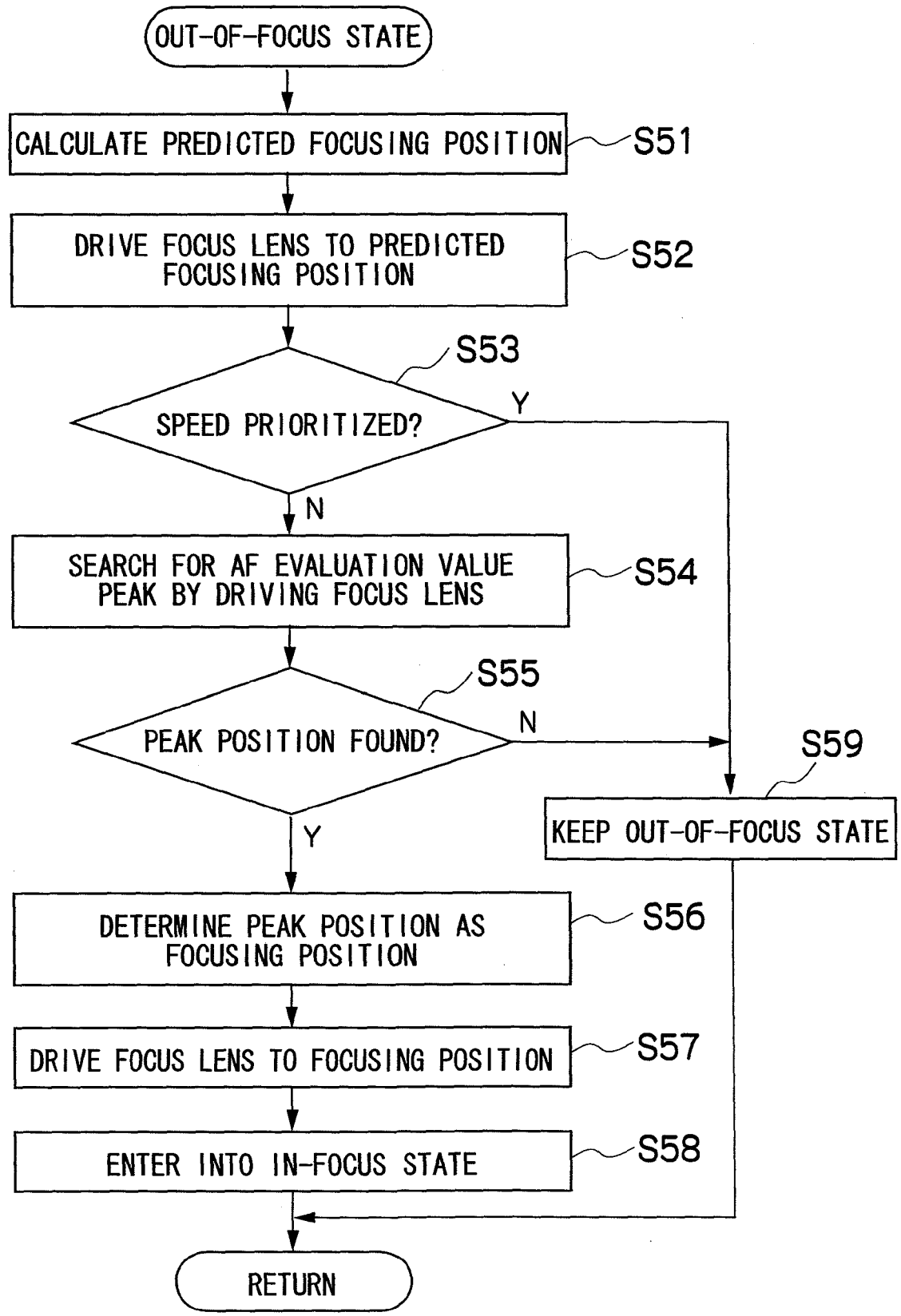
FIG. 17 is a flowchart showing exemplary focusing processing according to an eighth embodiment.

FIG. 17 is a flowchart showing a flow of focusing processing according to the eighth embodiment in an out-of-focus state. The processing is performed by the AF processing unit 62 under general control of the CPU 75 of the camera 1.

Steps S51 and S52 are the same as steps S11 and S12 of the first embodiment.

At step S53, the AF processing unit 62 judges which of the focusing speed and the focusing accuracy the user prioritizes. When the user inputs the selection between the focusing speed and the focusing accuracy from the operation unit 11, the user's selection is stored in the control circuit 72. At step S53, the AF processing unit 62 references the user's selection stored in the control circuit 72.

At step S54, the AF processing unit 62 drives the focus lens with the lens drive unit 51, and searches for the peak position by sliding the focus lens away from the predicted focusing position.

At step S55, the AF processing unit 62 judges whether the peak position is found or not. If the peak position is found, the operation proceeds to step S56. If the peak position is not found, the operation proceeds to step S59.

At step S56, the AF processing unit 62 determines the peak position as the focusing position. At step S57, the AF processing unit 62 slides the focus lens to the focusing position with the lens drive unit 51. At step S58, the AF processing unit 62 sets the focusing state flag on. At step S49, the AF processing unit 62 keeps the out-of-focus state.

For the user's selection input, the embodiment may be adapted to enable the user to select from the focusing speed prioritizing mode and the focusing accuracy prioritizing mode on a menu screen or the like. The options on the menu screen are not limited for directly asking the user which of the focusing speed and the focusing accuracy the user prioritizes, and may be for asking the user whether the subject is a moving object (equal to the case of the focusing speed prioritizing mode) or a static object (equal to the case of the focusing accuracy prioritizing mode).

Ninth Embodiment

The embodiment has a flow of focusing processing roughly the same as any of those in the first to the eighth embodiments. In the embodiment, at the step of calculating the predicted focusing position, the predicted focusing position is calculated based on the change in the pre-focus position. The "pre-focus position" is the focus lens position estimated from the size of the target in the image. For a face as the target, it is particularly referred to as "face pre-focus position".

Figure 18:
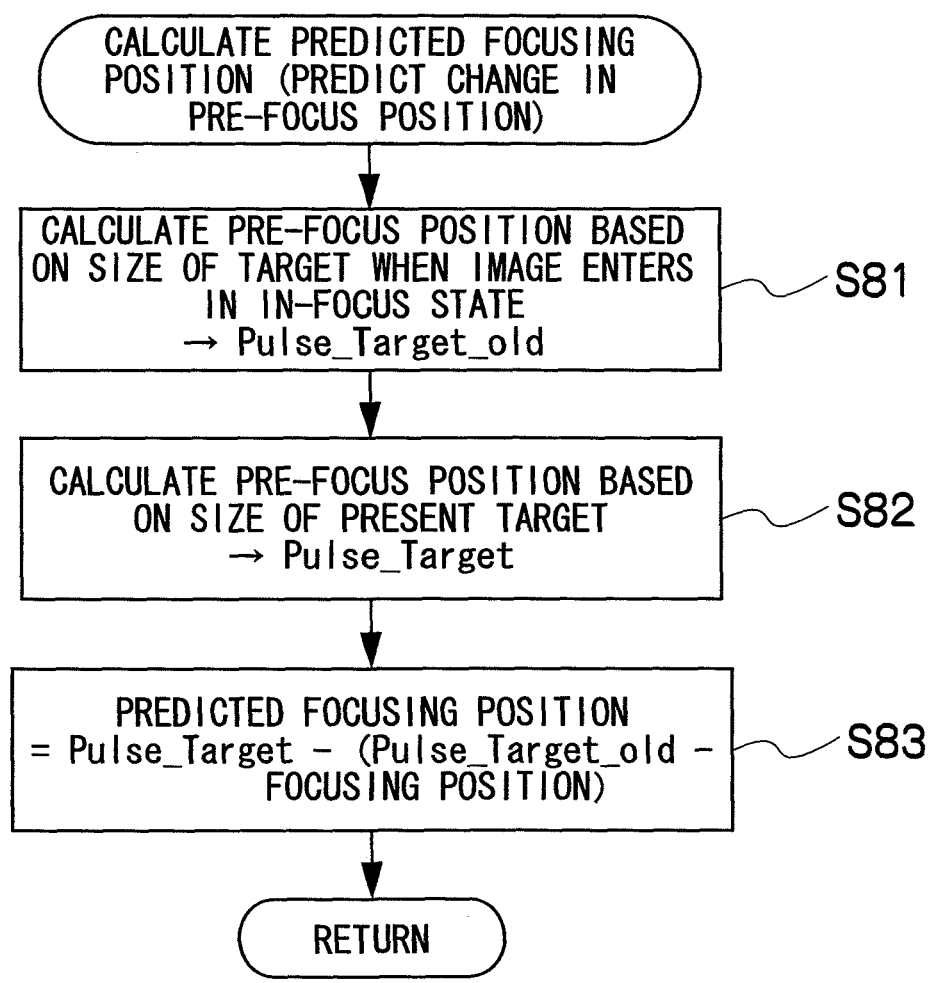
FIG. 18 is a flowchart showing exemplary predicted focusing position calculation processing according to a ninth embodiment.

FIG. 18 is a flowchart showing a flow of exemplary predicted focusing position calculation processing according to the embodiment.

At step S81, the AF processing unit 62 calculates the pre-focus position (Pulse_Target_old) based on the size of the target in the image measured when the image enters the in-focus state. For a face as the target, the face pre-focus position may be obtained by the technique disclosed by the applicant in Japanese Patent Application Laid-Open No. 2007-34261 in and after the paragraph 0240.

At step S82, the AF processing unit 62 calculates a new pre-focus position (Pulse_Target) based on the size of the target in the present image. For a face as the target, the face pre-focus position may be obtained by the above described technique.

At step S83, the AF processing unit 62 calculates the predicted focusing position from the predicted focusing position=Pulse_Target—(Pulse_Target_old—focusing position). The focusing position is the peak position detected based on the contrast in the image.

Figure 19:
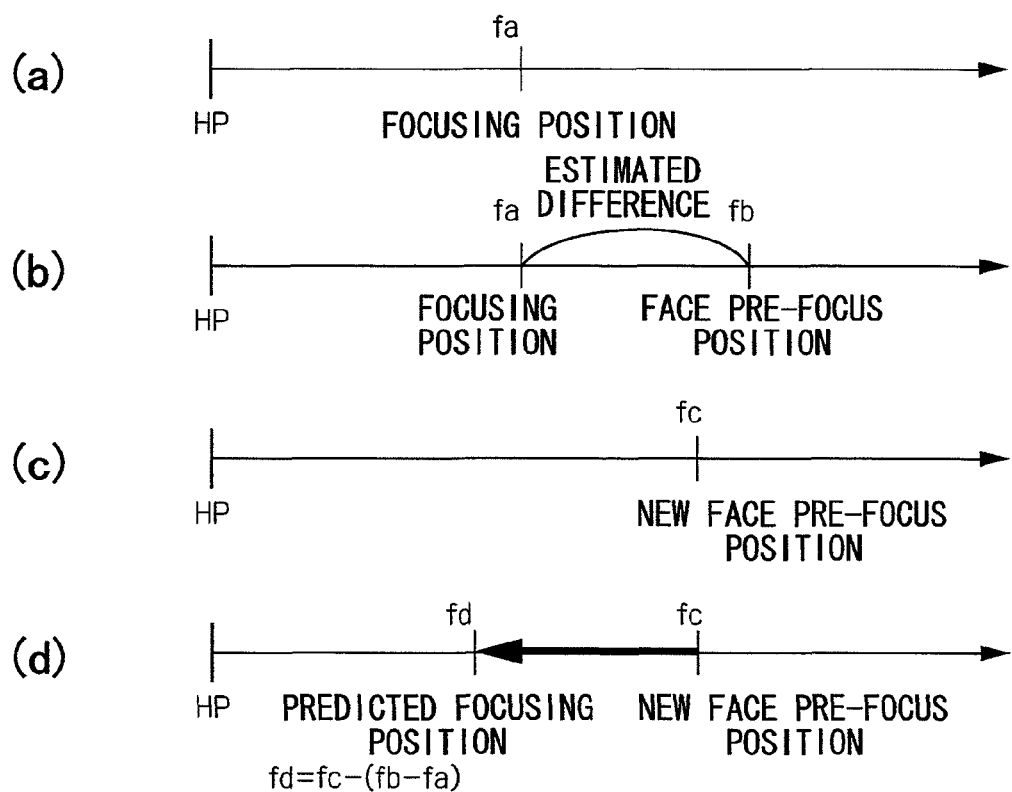
FIG. 19 is a diagram exemplifying relationships between pre-focus positions and the predicted focusing positions.

State (a) in FIG. 19 exemplifies the focusing position fa detected when the image enters the in-focus state. State (b) in FIG. 19 exemplifies the focusing position fa and the face pre-focus position fb ("Pulse_Target old" in FIG. 18) detected when the image enters the in-focus state. State (c) in FIG. 19 exemplifies the new face pre-focus position fc ("Pulse_Target" in FIG. 18). State (d) in FIG. 19 exemplifies the new face pre-focus position fc and the predicted focusing position fd. Through states (a) to (d) in FIG. 19, the abscissa indicates the focus lens position (focus position) in drive pulses from the origin position HP (home position for the focus lens).

The AF processing unit 62 calculates the drive pulse from the origin position HP of the focus lens to a past face pre-focus position Pb based on the size of the target (the face in the embodiment) in the image measured when the image enters the in-focus state, and obtains an estimated difference for the face pre-focus position (fb−fa) based on the difference between the drive pulse from HP to Pb and the drive pulse from HP to the focusing position Pa (FIGS. 19A, 19B).

Then, the AF processing unit 62 obtains the new face pre-focus position fc based on a new face detection result ((c) in FIG. 19).

The AF processing unit 62 determines the value of the new face pre-focus position fc corrected with the estimated difference for the face pre-focus position (fb−fa) as the predicted focusing position (fd=fc−(fb−fa)) ((d) in FIG. 19).

Specifically, the AF processing unit 62 obtains the predicted focusing position fd (=fc−(fb−fa)) by obtaining the difference (fb−fa) between the focusing position fa (the peak position obtained based on the contrast in the image as the focus lens position is being moved) and the pre-focus position fb corresponding to the focusing position fa (the focus lens position calculated based on the size of the target in present image measured when the image enters the in-focus state), and correcting the new face pre-focus position fc (the focus lens position calculated based on the target in the present image) with that difference. In other words, the AF processing unit 62 obtains the predicted focusing position fd (=fa+(fc−fb)) based on the change in the pre-focus position (fc−fb).

Although the embodiment has been described with the face as an example of the target, the target needs not to be limited to the face. With a relationship between size information on a particular target in the picked up image and the distance from the subject or the focusing position of the focus lens (for example, the drive amount), the predicted focusing position can also be calculated with a target other than the face.

Tenth Embodiment

The embodiment has a flow of focusing processing roughly the same as any of those in the first to the eighth embodiments. In the embodiment, the predicted focusing position is calculated based on the change in the size of the target in the image.

Figure 20:
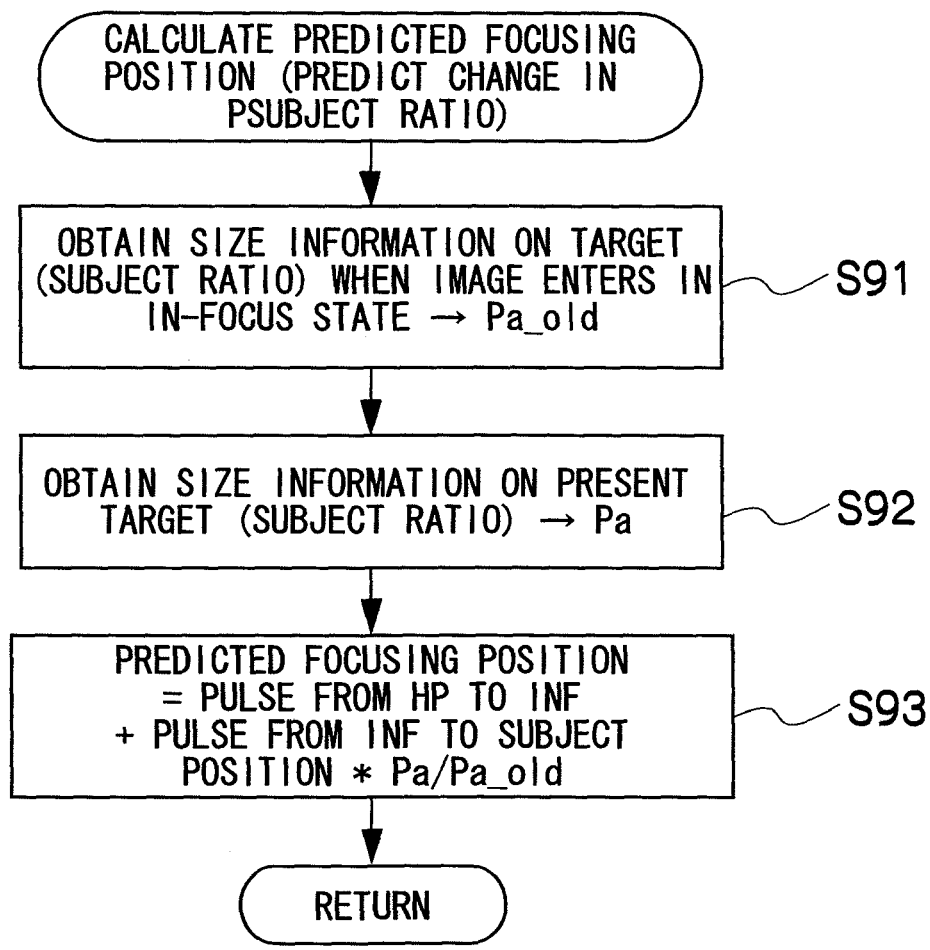
FIG. 20 is a flowchart showing exemplary predicted focusing position calculation processing according to a tenth embodiment.

FIG. 20 is a flowchart showing a flow of exemplary predicted focusing position calculation processing according to the embodiment. In the processing:

At step S91, the AF processing unit 62 obtains the size information on the target in the image measured when the image enters the in-focus state Pa_old (for example, a ratio of the target to the image). When the picked up entire image 201 shown in FIG. 2 has the face as the target, a ratio (Lf/Lv) of the length Lf of the face region 202 to the length Lv of the entire image 201 is used as the face size information.

At step S92, the AF processing unit 62 obtains the size information on the target in the present image Pa. For a face as the target, the size information on the face may be obtained by the above described technique.

At step S93, the AF processing unit 62 calculates the predicted focusing position by the predicted focusing position=infinity position INF+na*Pa/Pa_old. The infinity position INF is the drive pulse from the origin position HP to the infinity position INF. na is a pulse from the infinity position INF to the focusing position (present position). The focusing position is the peak position detected based on the contrast in the image.

Figure 21:
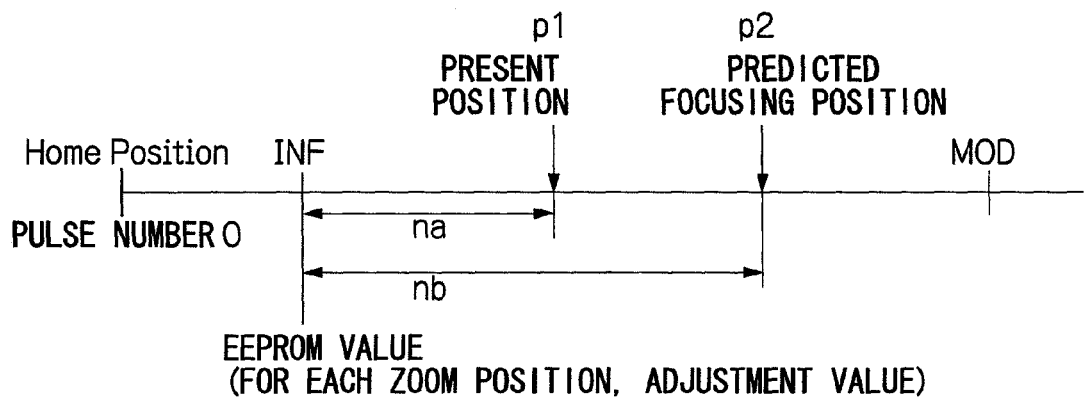
FIG. 21 is a diagram showing exemplary drive pulses corresponding to the present position and the predicted focusing position of the focus lens.

FIG. 21 exemplifies the origin position HP of the focus lens, the infinity position INF, the present position p1, the predicted focusing position p2, the drive pulse na from the infinity position INF to the present position p1, and the drive pulse nb from the infinity position INF to the predicted focusing position p2. The present position p1 is a focusing position detected in the past. The abscissa indicates the focus lens position (focus position) in drive pulses from the origin position HP.

The drive pulse from the infinity position INF to the focusing position is in proportion to the reciprocal of the subject distance. As the size of the target in the image is in inverse proportion to the subject distance, the drive pulse from the infinity position INF to the focusing position is in proportion to the size of the subject. Thus, the drive pulse na from the infinity position INF to p1 multiplied by the rate of change in the size of the target in the image (Pa/Pa_old) (na*Pa/Pa_old) is the drive pulse nb from the infinity position INF to the focusing position p2.

Accordingly, the predicted focusing position p2=INF+ na*Pa/Pa_old.

The present invention has been described by taking examples from the first embodiment to the ninth embodiment for easier understanding; though, it is needless to say that the present invention is not limited to implementation of each of the embodiments and may include any combination of the embodiments or application of the important part of other embodiments.

It should be understood that the present position is not limited to the examples described in the specification and shown in the figures, and various alterations and improvements may be performed without departing from the spirit of the present invention.

What is claimed is:

1. An image pickup apparatus, comprising:
   an image pickup optical system which forms an image of a subject;
   an imaging device which obtains an image by picking up the image of the subject via the image pickup optical system;
   a target detection device which detects a size of a target in the image;
   an in-focus prediction position calculation device which calculates an in-focus prediction position of the image pickup optical system where the target is predicted to be in-focus based on the size of the target detected by the target detection device;
   a first control device which causes a focus position of the image pickup optical system to move to an initial target position adjacent to the in-focus prediction position if an absolute value of a difference between the focus position and the in-focus prediction position is more than a threshold value, and does not cause the focus position to move if the absolute value of the difference between the focus position and the in-focus prediction position is equal to the threshold value or less than the threshold value; and
   a second control device which performs continuous AF that detects an in-focus position where a contrast in the image reaches a local maximum by moving the focus position of the image pickup optical system, moves the focus position of the image pickup optical system to the in focus position and keeps an in-focus state,
   wherein if the focus position of the image pickup optical system is moved by the first control device, the second control device detects an in-focus position based on the contrast in the image while causing the focus position of the image pickup optical system to move from the initial target position to the in-focus prediction position and causes the focus position of the image pickup optical system to move to the in-focus position, and if the focus position of the image pickup optical system is not moved by the first control device, the second control device maintains the focus position of the image pickup optical system and does not detect the in-focus position of the image pickup optical system.

2. The image pickup apparatus according to claim 1, wherein the image pickup optical system comprises a zoom mechanism, and the threshold value changes according to a zoom position or a focal length of the zoom mechanism.

3. The image pickup apparatus according to claim 1 wherein the threshold value changes according to the in-focus position of the image pickup optical system or a subject distance which corresponds to the in-focus position.

4. The image pickup apparatus according to claim 1, wherein the in-focus prediction position calculation device calculates the in-focus prediction position based on a relationship between the size of the target detected by the target detection device and at least one of a subject distance corresponding to the in-focus position and the in-focus position.

5. The image pickup apparatus according to claim 1, wherein the in-focus prediction position calculation device calculates the in-focus prediction position based on a proportion of a previous size of the target to a current size of the target detected by the target detection device.

6. The image pickup apparatus according to claim 1, further comprising:
   an evaluation value calculating device which calculates an evaluation value indicative of a contrast in the image, wherein the first control device does not perform control on the focus position according to the size of the target if the evaluation value is less than a referential value.

7. The image pickup apparatus according to claim 1, further comprising a movement detecting device which detects a movement of the subject, wherein the second control device does not detect the in-focus position based on the contrast in the image if the movement of the subject is faster than a predetermined speed.

8. The image pickup apparatus according to claim 1, further comprising a selection device which accepts a selection for prioritizing either of the accuracy or the speed of the in-focus, wherein the second control device detects the in-focus position based on the contrast in the image if the selection device accepts the selection for prioritizing the accuracy of the in-focus, and the second control device does not detect the in-focus position based on the contrast in the image if the selection device accepts the selection for prioritizing the speed of the in-focus.

9. The image pickup apparatus according to claim 1, further comprising an iris, wherein the threshold value changes according to F values of the iris.

10. The image pickup apparatus according to claim 9, further comprising a selection device which accepts a selection for prioritizing either of the accuracy or the speed of the in-focus, wherein the second control device detects the in-focus position based on the contrast in the image if the selection device accepts the selection for prioritizing the accuracy of the in-focus, and the second control device does not detect the in-focus position based on the contrast in the image if the selection device accepts the selection for prioritizing the speed of the in-focus.

11. An image pickup method used in an image pickup apparatus including an image pickup optical system which forms an image of a subject, an imaging device which obtains an image by picking up the image of the subject via the image pickup optical system, and a target detection device which detects a size of a target in the image, the image pickup method for performing:
   calculating of an in-focus prediction position of the image pickup optical system where the target is predicted to be in-focus based on the size of the target detected by the target detection device;
   a first control of controlling a focus position of the image pickup optical system to move to an initial target position adjacent to the in-focus prediction position if an absolute value of a difference between the focus position and the in-focus prediction position is more than a threshold value, and does not cause the focus position to move if the absolute value of the difference between the focus position and the in-focus prediction position is equal to the threshold value or less than the threshold value; and a second control of performing continuous AF that detects an in-focus position where a contrast in the image reaches the local maximum by moving the focus position of the image pickup optical system, moves the focus position of the image pickup optical system to the in-focus position and keeps an in-focus state wherein if the focus position of the image pickup optical system is moved by the first control, the second control detects an in-focus position based on the contrast in the image while causing the focus position of the image pickup optical system to move from the initial target position to the in-focus prediction position and causes the focus position of the image pickup optical system to move to the in-focus position, and if the focus position of the image pickup optical system is not moved by the first control, the second control maintains the focus position of the image pickup optical system and does not detect the in-focus position of the image pickup optical system.

12. An image pickup apparatus, comprising:
an image pickup optical system which forms an image of a subject;
an imaging device which obtains an image by picking up the image of the subject via the image pickup optical system;
a target detecting device which detects a size of a target in the image;
an in-focus prediction position calculation device which calculates an in-focus prediction position of the image pickup optical system where the target is predicted to be in-focus based on the size of the target detected by the target detection device;
a first control device which causes the focus position of the image pickup optical system to move to the in-focus prediction position if the absolute value of the difference between the focus position and the in-focus prediction position is more than a threshold value, and does not cause the focus position to move if the absolute value of the difference between the focus position and the in-focus prediction position is the threshold value or less; and
a second control device which performs continuous AF that detects an in-focus position where a contrast in the image reaches a local maximum by moving the focus position of the image pickup optical system, moves the focus position of the image pickup optical system to the in-focus position and keeps an in-focus state,
wherein if the focus position of the image pickup optical system is moved by the first control device, the second control device detects an in-focus position based on the contrast in the image while causing the focus position of the image pickup optical system to move from the in-focus prediction position and causes the focus position of the image pickup optical system to move to the in-focus position, and if the focus position of the image pickup optical system is not moved by the first control device, the second control device maintains the focus position of the image pickup optical system and does not detect the in-focus position of the image pickup optical system.

13. The image pickup apparatus according to claim 12, further comprising an iris, wherein the threshold value changes according to F values of the iris.

14. The image pickup apparatus according to claim 12, wherein the image pickup optical system comprises a zoom mechanism, and the threshold value changes according to a zoom position or a focal length of the zoom mechanism.

15. The image pickup apparatus according to claim 12 wherein the threshold value changes according to the in-focus position of the image pickup optical system or a subject distance which corresponds to the in-focus position.

16. The image pickup apparatus according to claim 12, wherein the in-focus prediction position calculation device calculates the in-focus prediction position based on a relationship between the size of the target detected by the target detection device and at least one of a subject distance corresponding to the in-focus position and the in-focus position.

17. The image pickup apparatus according to claim 12, wherein the in-focus prediction position calculation device calculates the in-focus prediction position based on a proportion of a previous size of the target to a current size of the target detected by the target detection device.

18. The image pickup apparatus according to claim 12, further comprising:
an evaluation value calculating device which calculates an evaluation value indicative of a contrast in the image, wherein the first control device does not perform control on the focus position according to the size of the target if the evaluation value is less than a referential value.

19. The image pickup apparatus according to claim 12, further comprising a movement detecting device which detects a movement of the subject, wherein the second control device does not detect the in-focus position based on the contrast in the image if the movement of the subject is faster than a predetermined speed.

20. An image pickup method used in an image pickup apparatus including an image pickup optical system which forms an image of a subject, the method comprising:
forming an image of a subject;
obtaining an image by picking up the image of the via the image pickup optical system;
detecting a size of a target in the image;
calculating an in-focus prediction position of the image pickup optical system where the target is predicted to be in-focus based on the detected size of the target;
a first control of controlling the focus position of the image pickup optical system to move to the in-focus prediction position if the absolute value of the difference between the focus position and the in-focus prediction position is more than a threshold value, and controlling to not cause the focus position to move if the absolute value of the difference between the focus position and the in-focus prediction position is the threshold value or less; and
a second control of controlling to perform continuous AF that detects an in-focus position where a contrast in the image reaches a local maximum by moving the focus position of the image pickup optical system, moving the focus position of the image pickup optical system to the in-focus position and keeping an in-focus state,
wherein if the focus position of the image pickup optical system is moved by the first control, the second control detects an in-focus position based on the contrast in the image while causing the focus position of the image pickup optical system to move from the in-focus prediction position and causes the focus position of the image pickup optical system to move to the in-focus position, and if the focus position of the image pickup optical system is not moved by the first control, the second control device maintains the focus position of the image pickup optical system and does not detect the in-focus position of the image pickup optical system.

* * * * *